US011175796B2

(12) United States Patent
Chen

(10) Patent No.: US 11,175,796 B2
(45) Date of Patent: Nov. 16, 2021

(54) MENU MANAGEMENT METHOD, SERVER, AND SYSTEM

(71) Applicant: Tencent Technology (Shenzhen) Company Limited, Shenzhen (CN)

(72) Inventor: Hao Chen, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 380 days.

(21) Appl. No.: 15/674,316

(22) Filed: Aug. 10, 2017

(65) Prior Publication Data

US 2017/0371508 A1 Dec. 28, 2017

Related U.S. Application Data

(63) Continuation-in-part of application No. PCT/CN2016/072139, filed on Jan. 26, 2016.

(30) Foreign Application Priority Data

Feb. 13, 2015 (CN) .......................... 201510080942.X

(51) Int. Cl.
*G06F 3/0482* (2013.01)
*G06Q 50/00* (2012.01)
(Continued)

(52) U.S. Cl.
CPC ......... *G06F 3/0482* (2013.01); *G06Q 10/101* (2013.01); *G06Q 50/01* (2013.01);
(Continued)

(58) Field of Classification Search
CPC .... G06F 3/0482; G06Q 10/101; G06Q 50/01; H04L 29/08; H04L 51/00; H04L 51/32;
(Continued)

(56) References Cited

U.S. PATENT DOCUMENTS 8,738,449 B1 * 5/2014 Cupps .................... G06Q 40/04
  705/15
8,881,021 B1 * 11/2014 Das ....................... G06F 16/9535
  715/744

(Continued)

FOREIGN PATENT DOCUMENTS

CN 104125131 A 10/2014
CN 104717284 A 6/2015
WO WO 2014172880 A1 10/2014

OTHER PUBLICATIONS

Tencent Technology, ISRWO, PCT/CN2016/072139, Mar. 21, 2016, 9 pgs.

(Continued)

*Primary Examiner* — Christopher J Fibbi
(74) *Attorney, Agent, or Firm* — Morgan, Lewis & Bockius LLP

(57) ABSTRACT

A menu management method is performed at a computing device, the method comprising: sending a request for accessing a menu management interface at a social networking platform server; and customizing, through the menu management interface, a user menu associated with the identifier of an official account by obtaining an interface address corresponding to the menu management interface; generating a management interface invoking request carrying the interface address and sending the management interface invoking request to the social networking platform server; receiving the management interface and changing at least one menu item of the user menu in accordance with the official account's definition; and returning the customized user menu to the social networking platform server, which forwards the customized user menu to a plurality of user accounts that have subscribed to the official account and enable them to exchange information with the official account through the customized user menu.

17 Claims, 14 Drawing Sheets

(51) Int. Cl.
  *H04L 29/08* (2006.01)
  *H04L 12/58* (2006.01)
  *H04W 4/21* (2018.01)
  *G06Q 10/10* (2012.01)

(52) U.S. Cl.
  CPC .............. *H04L 29/08* (2013.01); *H04L 51/00* (2013.01); *H04L 51/32* (2013.01); *H04L 67/02* (2013.01); *H04L 67/10* (2013.01); *H04L 67/306* (2013.01); *H04W 4/21* (2018.02); *H04L 67/20* (2013.01)

(58) Field of Classification Search
  CPC ......... H04L 67/02; H04L 67/10; H04L 67/20; H04L 67/306; H04W 4/21
  See application file for complete search history.

(56) References Cited

U.S. PATENT DOCUMENTS

| | | | | |
|---|---|---|---|---|
| 2004/0061720 A1* | 4/2004 | Weber | ................... | G06F 16/957 715/760 |
| 2008/0163109 A1* | 7/2008 | Srivatsan | .............. | G06F 3/0482 715/810 |
| 2008/0184146 A1* | 7/2008 | Kimball | .................. | G06F 3/048 715/765 |
| 2010/0042511 A1* | 2/2010 | Sundaresan | ........ | G06Q 30/0601 705/26.1 |
| 2011/0145064 A1* | 6/2011 | Anderson | .......... | G06Q 30/0255 705/14.53 |
| 2013/0302005 A1* | 11/2013 | Harwell | ............. | H04N 21/2408 386/200 |
| 2014/0157145 A1* | 6/2014 | Bush | ...................... | G06Q 50/01 715/745 |
| 2015/0012833 A1* | 1/2015 | Foy | ........................ | G06F 3/0346 715/738 |
| 2015/0046297 A1* | 2/2015 | Bahrami | ............... | G06F 3/0485 705/27.2 |
| 2016/0019553 A1* | 1/2016 | Zhang | ................... | H04M 3/493 715/728 |
| 2016/0234141 A1* | 8/2016 | Kim | ....................... | H04L 51/046 |

OTHER PUBLICATIONS

Tencent Technology, IPRP, PCT/CN2016/072139, Aug. 15, 2017, 8 pgs.
Gan, "Research on the Application Architecture of Wechat Platform Based Mobile-banking" Chinese Masters Theses Full Text Database Information Science and Technology, Jun. 15, 2014, Abstract.

* cited by examiner

MENU MANAGEMENT METHOD, SERVER, AND SYSTEM

RELATED APPLICATIONS

This application is a continuation-in-part application of PCT/CN2016/072139, entitled "METHOD, SERVER, AND SYSTEM FOR MENU MANAGEMENT" filed on Jan. 26, 2016, which claims priority to Chinese Patent Application No. 201510080942.X, filed with the State Intellectual Property Office of the People's Republic of China on Feb. 13, 2015, and entitled "METHOD, SERVER, AND SYSTEM FOR MENU MANAGEMENT", both of which are incorporated herein by reference in their entirety.

FIELD OF THE TECHNOLOGY

Embodiments of the present disclosure relate to the field of social networking platforms, and in particular, to a menu management method, server, and system.

BACKGROUND OF THE DISCLOSURE

Both an ordinary user and an operator can apply for a user account in a social application system. The operator may provide services such as query, notification, consultation, and customer service to the ordinary user by using the social application system.

In a related technology, the social application system may provide a social networking platform to the operator. A user account that the operator applies for in the social networking platform may be referred to as an official account. The operator may create a customized menu by using the social networking platform. The customized menu is displayed on an official account interaction interface between an ordinary user and the operator. In the customized menu, one of the services such as query, notification, consultation, and customer service may be provided.

In the implementation process of the embodiments of the present disclosure, the inventor finds that the related technology has at least the following problem:

An existing social networking platform only supports creating a customized menu, but cannot support more operations on the customized menu.

SUMMARY

According to a first aspect, a menu management method is provided, including:

obtaining an interface address corresponding to a menu management interface, the menu management interface being an interface provided by a social networking platform server and configured to manage a customized menu corresponding to an official account, and the official account being a user account that an operator applies for on the social networking platform server;

generating a management interface invoking request carrying the interface address, the management interface invoking request being used for invoking the menu management interface to perform a management operation on the customized menu; and sending the management interface invoking request to the social networking platform server.

According to a second aspect, a menu management method is provided, including:

receiving a management interface invoking request sent by an official account, the official account being a user account that an operator applies for on a social networking platform server; and invoking, according to an interface address carried in the management interface invoking request, a menu management interface corresponding to the interface address, to perform a management operation on a customized menu of the official account, the menu management interface being an interface provided by the social networking platform server and configured to manage the customized menu corresponding to the official account.

According to a third aspect, a menu management apparatus is provided, including:

an address obtaining module, configured to obtain an interface address corresponding to a menu management interface, the menu management interface being an interface provided by a social networking platform server and configured to manage a customized menu corresponding to an official account, and the official account being a user account that an operator applies for on the social networking platform server;

a request generation module, configured to generate a management interface invoking request carrying the interface address, the management interface invoking request being used for invoking the menu management interface to perform a management operation on the customized menu; and a request sending module, configured to send the management interface invoking request to the social networking platform server.

According to a fourth aspect, a menu management apparatus is provided, including:

a request receiving module, configured to receive a management interface invoking request sent by an official account, the official account being a user account that an operator applies for on a social networking platform server; and a menu management module, configured to invoke, according to an interface address carried in the management interface invoking request, a menu management interface corresponding to the interface address, to perform a management operation on a customized menu of the official account, the menu management interface being an interface provided by the social networking platform server and configured to manage the customized menu corresponding to the official account.

According to a fifth aspect, a menu management system is provided, including a third-party server and a social networking platform server, the third-party server being connected to the social networking platform server;

the third-party server including the menu management apparatus according to the third aspect; and the social networking platform server including the menu management apparatus according to the fourth aspect.

According to a sixth aspect, a third-party server is provided, the server including a central processing unit and a memory, the memory storing a set of program code, and the central processing unit executing the program code stored in the memory, to complete the following operations:

obtaining an interface address corresponding to a menu management interface, the menu management interface being an interface provided by a social networking platform server and configured to manage a customized menu corresponding to an official account, and the official account being a user account that an operator applies for on the social networking platform server;

generating a management interface invoking request carrying the interface address, the management interface invoking request being used for invoking the menu management interface to perform a management operation on the customized menu; and sending the management interface invoking request to the social networking platform server.

According to seventh aspect, a social networking platform server is provided, including a central processing unit and a memory, the memory storing a set of program code, and the central processing unit executing the program code stored in the memory, to complete the following operations:

receiving a management interface invoking request sent by an official account, the official account being a user account that an operator applies for on the social networking platform server; and invoking, according to an interface address carried in the management interface invoking request, a menu management interface corresponding to the interface address, to perform a management operation on a customized menu of the official account, the menu management interface being an interface provided by the social networking platform server and configured to manage the customized menu corresponding to the official account.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other accompanying drawings from these accompanying drawings without creative efforts.

DESCRIPTION OF EMBODIMENTS

To make objectives, technical solutions, and advantages of the present disclosure clearer, the following further describes embodiments of the present disclosure in detail with reference to the accompanying drawings.

First, some terms involved in the embodiments of the present disclosure are defined and explained.

1. A user account refers to a user account that an operator applies for on a social networking platform. The operator usually refers to an institution or an individual that receive much attention from users, for example, a merchant, an enterprise, a government, media, or a celebrity. This type of user account is also referred to as an official account.

2. An operator refers to the owner of a user account, that is, an institute or an individual that applies for the foregoing user account, and is also referred to as an official account operator.

3. An social networking platform refers to a platform that provides an interface to a third-party server on the basis of an original software system, enhances a function of the original software system by means of access of the third-party server, or uses a resource of the original software system, for example, a WeChat official platform, an Alipay service window platform, or a Baidu Zhida social networking platform. The original software system may be a social application system, a payment application system, or another related application system. Using a social application system as an example, after an operator applies for a user account on a social networking platform in the social application system, an ordinary user in the social application system may follow the user account, or become a friend of the user account. Then, the ordinary user and the operator may exchange information, such as a text, an image, a voice, or a video, by using the social application system as a medium.

4. A customized menu is a menu generated by a social networking platform for a user account of an operator. The menu is displayed on an interaction interface between an ordinary user and the operator. A menu style of the menu is defined by the operator, and the menu is generated by invoking, by a third-party server, a menu creation interface provided by a social networking platform server.

Figure 1:
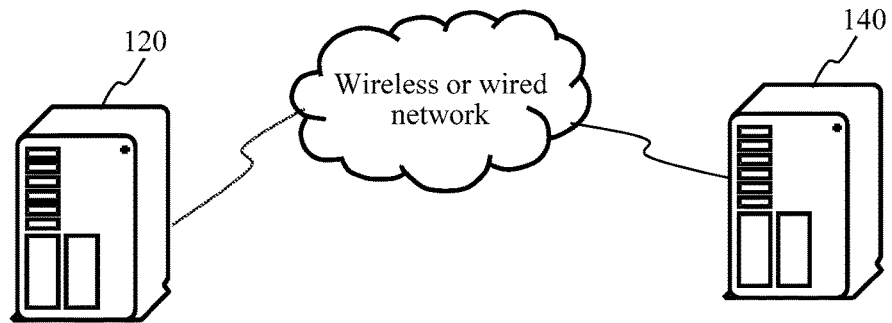
FIG. 1 is a schematic structural diagram of an implementation environment according to some embodiments of the present disclosure.

Referring to FIG. 1, FIG. 1 is a schematic structural diagram of an implementation environment according to an embodiment of the present disclosure. The implementation environment includes a third-party server 120 and a social networking platform server 140.

The third-party server 120 may be a server, or a server cluster consisting of several servers, or a cloud computing service center. The third-party server 120 is usually maintained by an operator, where the operator may be a merchant, a company, a bank, a studio, or the like.

The third-party server 120 is connected to the social networking platform server 140 by using a wired network or a wireless network.

The social networking platform server 140 may be a server, or a server cluster consisting of several servers, or a cloud computing service center.

In a possible implementation manner, the third-party server 120 may be a background server used by an operator to provide various services to followers of an official account. The social networking platform server 140 may be a server accessed by different third-party servers 120. The "third-party" in the "third-party server" herein is relative to the "social networking platform server", and it does not necessarily mean that the "third-party server" and the "social networking platform server" belong to different owners. The "third-party server" and the "social networking platform server" may be different servers belonging to a same owner.

In this embodiment of the present disclosure, the social networking platform server 140 provides a menu management interface. The third-party server 120 implements, by invoking the menu management interface, a management operation on a customized menu already created for an official account, where the management operation includes a recreation operation, a query operation, or a deletion operation.

Figure 2:
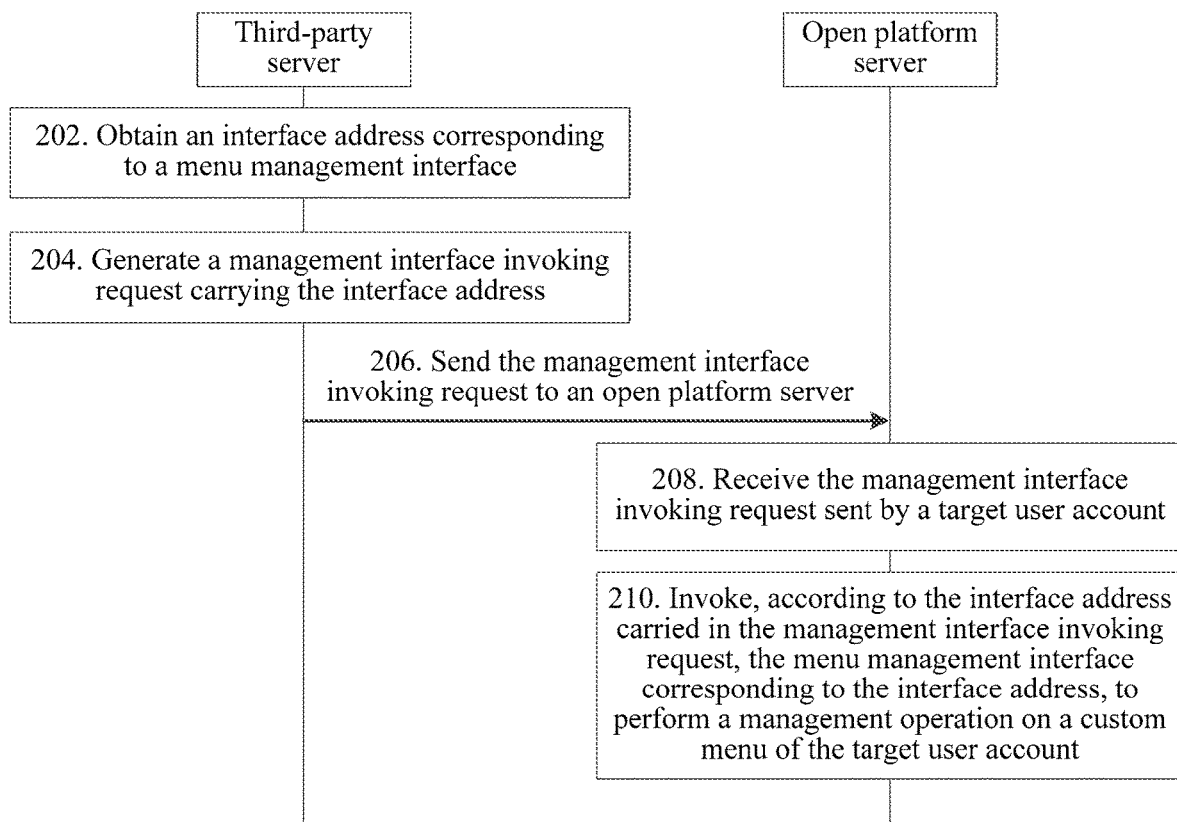
FIG. 2 is a method flowchart of a menu management method according to some embodiments of the present disclosure.

Referring to FIG. 2, FIG. 2 is a method flowchart of a menu management method according to an embodiment of the present disclosure. This embodiment is described by using an example in which the menu management method is applied to the implementation environment shown in FIG. 1. The menu management method includes:

Step 202: A third-party server obtains an interface address corresponding to a menu management interface.

The menu management interface is an interface provided by a social networking platform server and configured to manage a customized menu corresponding to an official account. The official account is a user account that an operator applies for on the social networking platform server, and is a user account corresponding to the third-party server. The customized menu is a menu displayed on an interaction interface for interaction between a client and the official account.

Step 204: The third-party server generates a management interface invoking request carrying the interface address.

The management interface invoking request is used for invoking the menu management interface provided by the social networking platform server.

Step 206: The third-party server sends the management interface invoking request to a social networking platform server.

The third-party server sends the management interface invoking request to the social networking platform server by using the official account.

Step 208: The social networking platform server receives the management interface invoking request sent by an official account.

Step 210: The social networking platform server invokes, according to the interface address carried in the management interface invoking request, the menu management interface corresponding to the interface address, to perform a management operation on a customized menu of the official account.

In conclusion, according to the menu management method provided in this embodiment, a social networking platform server provides a menu management interface, so that an operator may manage a created customized menu, thereby resolving a problem in a related technology that the social networking platform server only supports creation of a customized menu by the operator, and achieving an effect that the social networking platform server further supports a management operation, such as a recreation operation, a query operation, or a deletion operation, performed by the operator on a customized menu.

It should be noted that step 202, step 204, and step 206 may be implemented as a menu management method on the side of the third-party server. Step 208 and step 210 may be implemented as a menu management method on the side of the social networking platform server.

First, an embodiment used for creating a customized menu is proposed. This embodiment is used for describing and improving a process of creating, by a third-party server, a customized menu by using a social networking platform server.

Figure 3A:
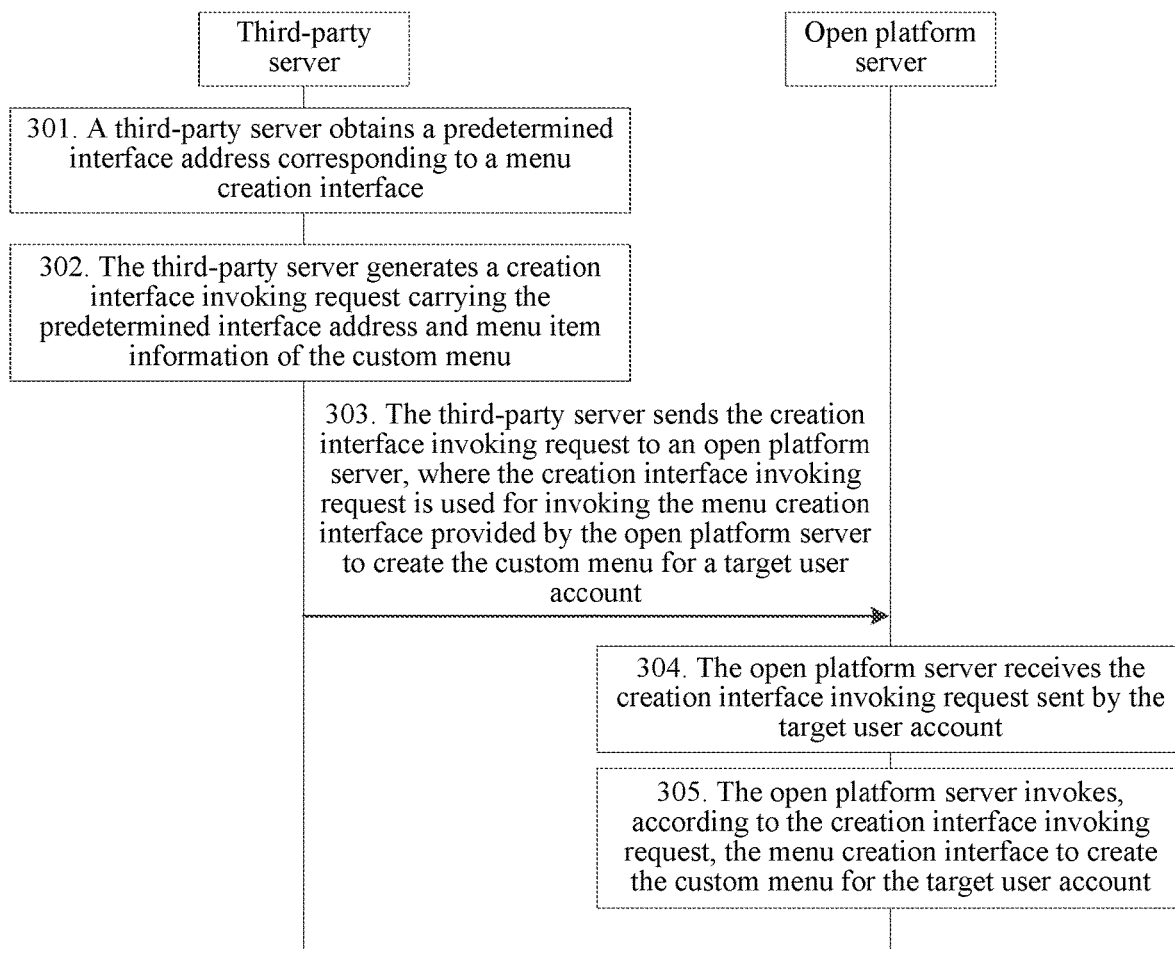
FIG. 3A is a method flowchart of a menu creation method according to some embodiments of the present disclosure.

Referring to FIG. 3A, FIG. 3A is a method flowchart of a menu creation method according to an embodiment of the present disclosure. This embodiment is described by using an example in which the menu creation method is applied to the implementation environment shown in FIG. 1. The menu creation method includes:

Step 301: A third-party server obtains a pre-configured interface address corresponding to a menu creation interface.

The menu creation interface is an interface provided by a social networking platform server, and the interface is configured to create a customized menu.

In an example, the pre-configured interface address corresponding to the menu creation interface may be:
https://api.xxxxx.com/cgi-bin/menu/create?

Step 302: The third-party server generates a creation interface invoking request carrying the pre-configured interface address and menu item information of a customized menu.

A request protocol used by the creation interface invoking request may be the Hypertext Transfer Protocol (HTTP), or may be the Hyper Text Transfer Protocol over Secure Socket Layer (HTTPS), or another custom protocol. A request manner used by the creation interface invoking request may be a POST request manner.

The third-party server generates the creation interface invoking request carrying the pre-configured interface address and the menu item information of the customized menu. The menu item information includes a click-event menu item and/or a link redirection menu item, where the click-event menu item is a menu item that generates a click event after being triggered by a client, and the link redirection menu item is a menu item that redirects to a predetermined link after being triggered by a client. When the request manner used by the creation interface invoking request is the POST request manner, the menu item information may be carried in a POST packet.

In an example, the creation interface invoking request may use a POST request manner (the https Protocol is used):
https://api.xxxxx.com/cgi-bin/menu/create?access_token=ACCESS_TOKEN
where access_token=ACCESS_TOKEN is an interface invoking authorization, and is obtained in advance by the third-party server from the social networking platform server, that is, the creation interface invoking request may further carry the interface invoking authorization.

In an example, the POST packet carrying the menu item information may be:

```
{
    "button":[
    {
        "type":"click",
        "name":"today's song",
        "key":"V1001_TODAY_MUSIC"
    },
    {
        "name":"menu",
        "sub_button":[
        {
            "type":"view",
            "name":"search",
            "url":"http://www.website 1.com/"
        },
        {
            "type":"view",
            "name":"video",
            "url":"http:// www.website 2.com /"
        },
        {
            "type":"click",
            "name":"like",
            "key":"V1001_GOOD"
        }]
    }]
}
```

Descriptions about the foregoing parameters in the POST packet are shown in Table 1:

TABLE 1

| Parameter | Mandatory or not | Descriptions |
| --- | --- | --- |
| button | Yes | It represents a level-1 menu array, and the quantity should be 1 to 3. |
| sub_button | Not | It represents a level-2 menu array, and the quantity should be 1 to 5. |
| type | Yes | It represents a response action type of a menu. |
| name | Not | It represents a menu title, which does not exceed 16 bytes, and does not exceed 40 bytes for a submenu |
| key | Mandatory for a click-type menu | It represents a menu KEY value, which is used for pushing a message interface, and does not exceed 128 bytes |
| url | Mandatory for a view-type menu | It represents a webpage link, where a user may open the webpage link by clicking a menu, and it does not exceed 256 bytes |

The click-type menu item is also referred to as a click-event menu item, which is a menu item that generates a click event after being triggered by a client. After receiving the click-event menu item, the third-party server pushes a message to the client. The client refers to a client used by an ordinary user.

The view-type menu item is also referred to as a link redirection menu item, which is a menu item that redirects to a webpage link after being triggered by the client, where the webpage link is set by the third-party server in the POST packet.

It should be further noted that types of the menu items are not necessarily limited to the click-event menu item and the link redirection menu item. A person skilled in the art may further develop, based on this, a menu item for scanning a graphic code, a menu item for opening a predetermined application, and the like. The type of the menu item of the customized menu is not specifically limited in this embodiment.

Step 303: The third-party server sends the creation interface invoking request to a social networking platform server, where the creation interface invoking request is used for invoking the menu creation interface provided by the social networking platform server to create the customized menu for an official account.

Step 304: The social networking platform server receives the creation interface invoking request sent by the third-party server.

The creation interface invoking request carries a first interface address and the menu item information of the customized menu, where the menu item information includes the click-event menu item and/or the link redirection menu item.

Step 305: The social networking platform server invokes, according to the creation interface invoking request, the menu creation interface to create the customized menu for the official account.

Figure 3B:
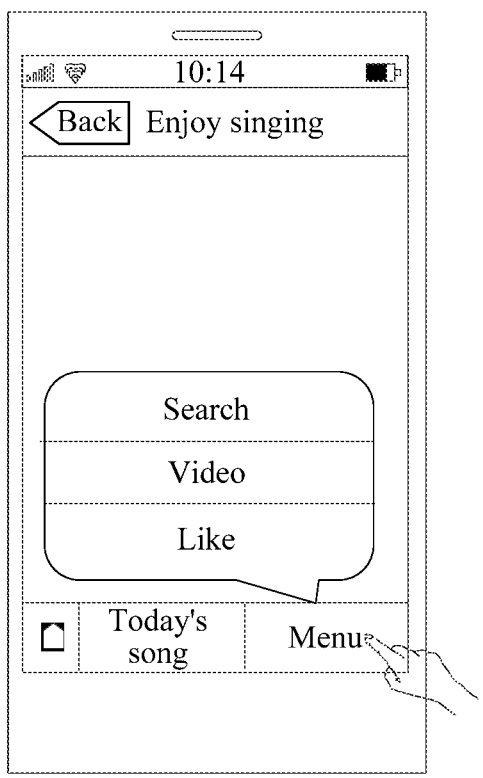
FIG. 3B is a schematic diagram of a user interface during implementation of the menu creation method

For example, the customized menu generated by the social networking platform server according to the foregoing creation interface invoking request may be shown in FIG. 3B. The customized menu 32 includes a level-1 menu item "today's song" and a level-1 menu item "menu", where the level-1 menu item "menu" includes level-2 menu items "search", "video" and "like".

When an ordinary user interacts with the official account by using the client, the customized menu 32 may be displayed. When the ordinary user triggers the level-1 menu item "today's song", a click event is triggered and sent to the third-party server. The third-party server pushes a message to the client according to the click event. When the ordinary user triggers the level-2 menu item "search", the webpage link "http: //www.website 1.com" is redirected to.

Optionally, the social networking platform server may further return a creation result to the third-party server by using the official account.

In an example, when the customized menu is correctly created, the creation result returned by the social networking platform server in a form of a JavaScript Object Notation (JSON, a lightweight data interchange format) packet may be as follows:

{"errcode":0, "errmsg":"ok"}

When an error occurs in creation of the customized menu, the JSON packet returned by the social networking platform server in the case of a JSON error is as follows (the following example is an error example when a size of a menu name is invalid):

{"errcode":40018, "errmsg":"invalid button name size"}, that is, when the returned creation result indicates an error, error information may be carried in the creation result and sent to the third-party server.

In conclusion, in the menu creation method provided in this embodiment, a customized menu including a click-event menu item and/or a link redirection menu item may be created, so that the customized menu may be used by the official account to provide services such as query, notification, consultation, and a customer service.

Step 301, step 302, and step 303 above may be independently implemented as a menu creation method on the side of the third-party server. Step 304 and step 305 may be independently implemented as a menu creation method on the side of the social networking platform server.

It should be additionally noted that if an official account maintained by an operator has many followers, when these followers are grouped into different follower groups by the operator, the operator may further generate different customized menus for the different follower groups.

Figure 3C:
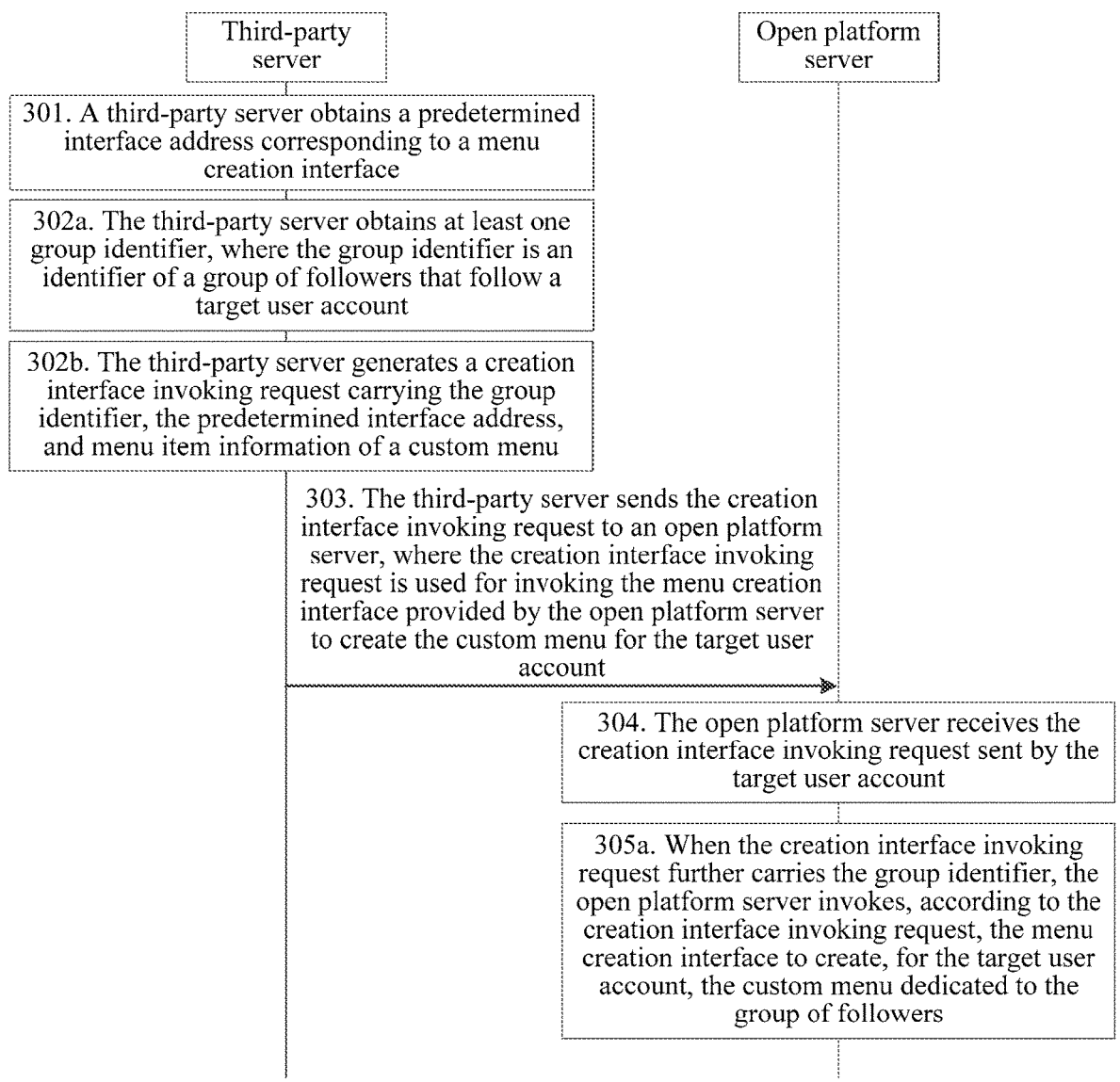
FIG. 3C is a method flowchart of a menu creation method according to some embodiments of the present disclosure.

In this case, step 302 may be replaced with step 302a and step 302b, as shown in FIG. 3C:

Step 302a: The third-party server obtains at least one group identifier, where the group identifier is an identifier of a group of followers that follow the official account.

The official account is an account registered by the third-party server on the social networking platform server. When there are many followers that follow the official account, the operator may group the followers into different follower groups.

For example, the followers are grouped, according to regions, into: an East China user group, a South China user group, a southwest user group, and the like.

For another example, the followers are grouped, according to levels, into: a platinum user group, a gold user group, a bronze user group, and an ordinary user group.

If the operator wants to create a customized menu dedicated to the "platinum user group", the third-party server obtains a group identifier of the "platinum user group" entered or selected by the operator.

Step 302b: The third-party server generates a creation interface invoking request carrying the group identifier, the pre-configured interface address, and the menu item information of the customized menu.

The creation interface invoking request is used for invoking the menu creation interface to create, for the official account, the customized menu dedicated to the group of followers.

The group identifier may be carried in a new field in a POST packet.

Correspondingly, step 305 may be replaced with step 305a, as shown in FIG. 3C:

Step 305a: When the creation interface invoking request further carries the group identifier, the social networking platform server invokes, according to the creation interface invoking request, the menu creation interface to create, for the official account, the customized menu dedicated to the group of followers.

In conclusion, according to the menu creation method provided in this embodiment, for a same operator, different customized menus may be generated for different groups of followers, so that the operator may provide different forms of customized menus for the different groups of followers, so as to provide a more detailed and specific service.

A recreation operation, a query operation, and a deletion operation are described one by one below by using three embodiments.

Figure 4A:
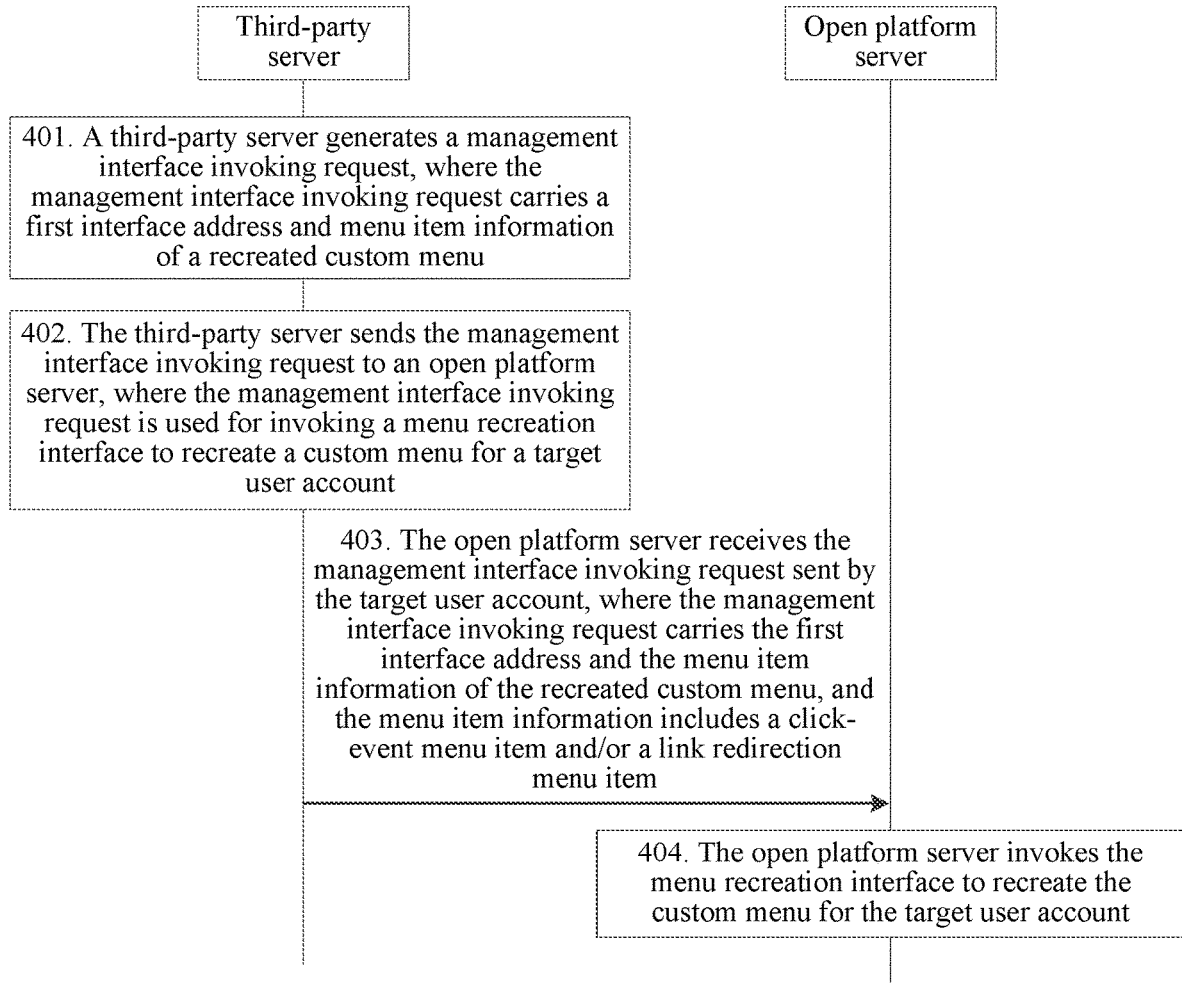
FIG. 4A is a method flowchart of a menu management method according to some embodiments of the present disclosure.

Referring to FIG. 4A, FIG. 4A is a method flowchart of a menu management method according to an embodiment of the present disclosure. This embodiment is described by using an example in which the menu management method is applied to the implementation environment shown in FIG. 1. The menu management method includes:

Step 401: A third-party server generates a management interface invoking request, where the management interface invoking request carries a first interface address and menu item information of a recreated customized menu.

After a customized menu is initially created, an operator may have a requirement of modifying the created customized menu. In this case, the operator may generate a management interface invoking request by using the third-party server, where the management interface invoking request carries a first interface address and menu item information of a recreated customized menu, and the first interface address is an interface address corresponding to a menu recreation interface.

The menu recreation interface may be implemented by using an individual interface, and may also be referred to as an update interface. However, in this embodiment, an example in which the recreation operation interface and a menu creation interface are a same interface is used for description. Reusing the recreation operation interface and the menu creation interface as a same interface may reduce the quantity of interfaces that need to be maintained by a social networking platform server, and improve usage efficiency of the menu creation interface. In other words, in this embodiment of the present disclosure, the menu creation interface is further used as a menu management interface.

This step may include the following sub-steps:

First, the third-party server obtains the first interface address corresponding to the menu recreation interface.

The menu recreation interface is an interface provided by the social networking platform server to the third-party server.

In an example, when the menu creation interface and the menu recreation interface are a same interface, the first interface address corresponding to the menu recreation interface may be:

https://api.xxxxx.com/cgi-bin/menu/create?

Second, the third-party server generates the management interface invoking request carrying the first interface address and menu item information of the recreated customized menu, where the menu item information includes a click-event menu item and/or a link redirection menu item, the click-event menu item is a menu item that generates a click event after being triggered by a client, and the link redirection menu item is a menu item that redirects to a predetermined link after being triggered by a client.

A request protocol used by the management interface invoking request may be the Hypertext Transfer Protocol (HTTP), or may be the Hyper Text Transfer Protocol over Secure Socket Layer (HTTPS), or another custom protocol. A request manner used by the management interface invoking request may be a POST request manner, or may be a GET request manner.

The third-party server generates the management interface invoking request carrying the first interface address and the menu item information of the customized menu. When the request manner used by the management interface invoking request is the POST request manner, the menu item information may be carried in a POST packet.

In an example, the management interface invoking request may use the POST request manner (the https Protocol is used):

https://api.xxxxx.com/cgi-bin/menu/
create?access_token=ACCESS_TOKEN where access_token=ACCESS_TOKEN is an interface invoking authorization, and is obtained in advance by the third-party server from the social networking platform server, that is, the management interface invoking request may further carry the interface invoking authorization.

In an example, the POST packet carrying the menu item information may be:

```
{
  "button":[
    {
      "type":"click",
      "name":"today's song",
      "key":"V1001_TODAY_MUSIC"
    },
    {
      "name":"menu",
      "sub_button":[
        {
```

```
        "type":"view",
        "name":"video search",
        "url":"http://www.website1.com/"
      },
      {
        "type":"view",
        "name":"video on demand",
        "url":"Error! Hyperlink reference not valid."
      },
      {
        "type":"click",
        "name":"like",
        "key":"V1001_GOOD"
      }]
    }]
  }
```

Different from the embodiment of FIG. 3A, in the recreation operation in this embodiment, the name "search" of the level-2 menu item is changed to be "video search"; and the name "video" of the level-2 menu item is changed to be "video on demand".

For descriptions about the foregoing parameters in the POST packet, refer to Table 1.

Step 402: The third-party server sends the management interface invoking request to a social networking platform server, where the management interface invoking request is used for invoking a menu recreation interface to recreate a customized menu for an official account.

The third-party server sends the management interface invoking request to the social networking platform server by using the official account.

Step 403: The social networking platform server receives the management interface invoking request sent by the official account, where the management interface invoking request carries the first interface address and the menu item information of the recreated customized menu, and the menu item information includes a click-event menu item and/or a link redirection menu item.

Step 404: The social networking platform server invokes the menu recreation interface to recreate the customized menu for the official account.

Figure 4B:
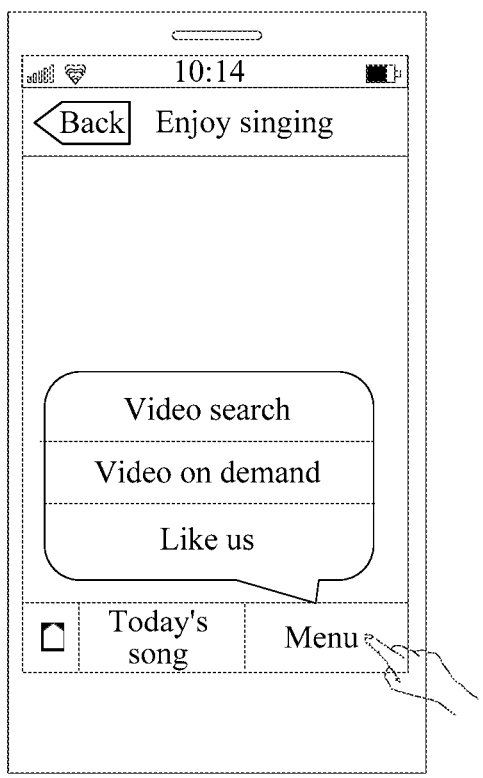
FIG. 4B is a schematic diagram of a user interface according to some embodiments of the present disclosure.

For example, the customized menu generated by the social networking platform server according to the foregoing management interface invoking request may be shown in FIG. 4B. The customized menu 42 includes a level-1 menu item "today's song" and a level-1 menu item "menu", where the level-1 menu item "menu" includes level-2 menu items "video search", "video on demand" and "like".

Optionally, the social networking platform server may further return a recreation result to the third-party server by using the official account.

In an example, when the customized menu is correctly recreated, the creation result returned by the social networking platform server in a form of a JavaScript Object Notation (JSON, a lightweight data interchange format) packet may be as follows:

{ "errcode":0, "errmsg":"ok"}

When an error occurs during recreation of the customized menu, the JSON packet returned by the social networking platform server in the case of a JSON error is as follows (the following example is an error example when a size of a menu name is invalid):

{"errcode": 40018, "errmsg": "invalid button name size"}, that is, when the returned creation result indicates an error, error information may be carried in the recreation result and sent to the third-party server.

In conclusion, according to the menu management method provided in this embodiment, a social networking platform server provides a menu recreation interface, so that an operator may recreate a created customized menu, thereby resolving a problem in a related technology that the social networking platform server only supports that creation of a customized menu by the operator, and achieving an effect that the social networking platform server further supports a recreation operation performed by the operator on a customized menu.

Step 401 and step 402 may be independently implemented as a menu management method on the side of the third-party server. Step 403 and step 404 may be independently implemented as a menu management method on the side of the social networking platform server.

Figure 5:
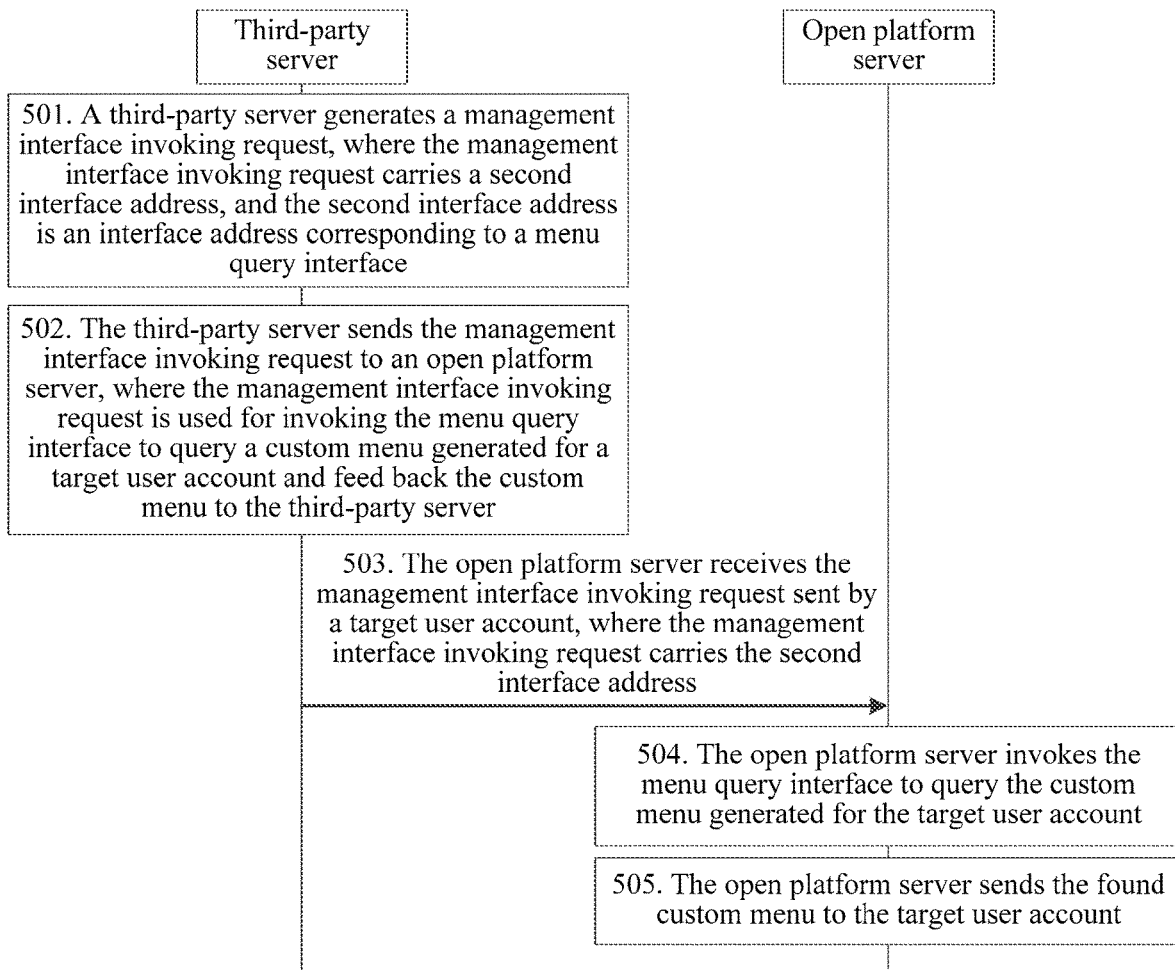
FIG. 5 is a method flowchart of a menu management method according to some embodiments of the present disclosure.

Referring to FIG. 5, FIG. 5 is a method flowchart of a menu management method according to an embodiment of the present disclosure. This embodiment is described by using an example in which the menu management method is applied to the implementation environment shown in FIG. 1. The menu management method includes:

Step 501: A third-party server generates a management interface invoking request, where the management interface invoking request carries a second interface address, and the second interface address is an interface address corresponding to a menu query interface.

After a customized menu is initially created, an operator may have a requirement of querying the created customized menu, for example, a requirement of determining whether the created customized menu is correct. In this case, the operator may generate a management interface invoking request by using the third-party server, where the management interface invoking request carries a second interface address, and the second interface address is an interface address corresponding to a menu query interface.

This step may include the following sub-steps:

First, the third-party server obtains the second interface address corresponding to the menu query interface.

The menu query interface is an interface provided by a social networking platform server to the third-party server.

In an example, the second interface address corresponding to the menu query interface may be:

https://api.xxxxx.com/cgi-bin/menu/get?

Second, the third-party server generates the management interface invoking request carrying the second interface address.

A request protocol used by the management interface invoking request may be the Hypertext Transfer Protocol (HTTP), or may be the Hyper Text Transfer Protocol over Secure Socket Layer (HTTPS), or another custom protocol. A request manner used by the management interface invoking request may be a POST request manner, or may be a GET request manner.

The third-party server generates the management interface invoking request carrying the second interface address. A request manner used by the management interface invoking request may be a GET request manner.

In an example, the management interface invoking request may use the GET request manner (the https Protocol is used):

https://api.xxxxx.com/cgi-bin/menu/
get?access_token=ACCESS_TOKEN where access_token=ACCESS_TOKEN is an interface invoking authorization, and is obtained in advance by the third-party server from the social networking platform server, that is, the management interface invoking request may further carry the interface invoking authorization.

Step 502: The third-party server sends the management interface invoking request to a social networking platform server, where the management interface invoking request is used for invoking the menu query interface to query a customized menu generated for an official account and return the customized menu to the third-party server.

The third-party server sends the management interface invoking request to the social networking platform server by using the official account.

Step 503: The social networking platform server receives the management interface invoking request sent by the official account, where the management interface invoking request carries the second interface address.

Step 504: The social networking platform server invokes the menu query interface corresponding to the second interface address to query the customized menu generated for the official account.

The generated customized menu may be expressed in a form of a JSON packet.

In an example, the customized menu generated by the social networking platform server for the official account may be as follows:
{"menu":{"button":[{"type":"click","name":"today's song","key":"V1001_TODAY_MUSIC","sub_button":[ ]},{"type":"click","name":"singer introduction","key":"V1001_TODAY_SINGER","sub_button":[ ]},{"name":"menu","sub_button":[{"type":"view","name":"search","url":"http://www.soso.com/","sub_button":[ ]},{"type":"view","name":"video","url":"http://v.qq.com/","sub_button":[ ]},{"type":"click","name":"like","key":"V1001_GOOD","sub_button":[ ]}]}]}}

Step 505: The social networking platform server sends the found customized menu to the official account.

The social networking platform server sends the found customized menu to the third-party server in a form of a JSON packet by using the official account. The third-party server may display the customized menu for the operator to see.

In conclusion, according to the menu management method provided in this embodiment, a social networking platform server provides a menu query interface, so that an operator may query a created customized menu, thereby resolving a problem in a related technology that the social networking platform server only supports creation of a customized menu by the operator, and achieving an effect that the social networking platform server further supports query of a customized menu by the operator.

Step 501, step 502, and step 503 may be independently implemented as a menu management method on the side of the third-party server. Step 504 and step 505 may be independently implemented as a menu management method on the side of the social networking platform server.

Figure 6:
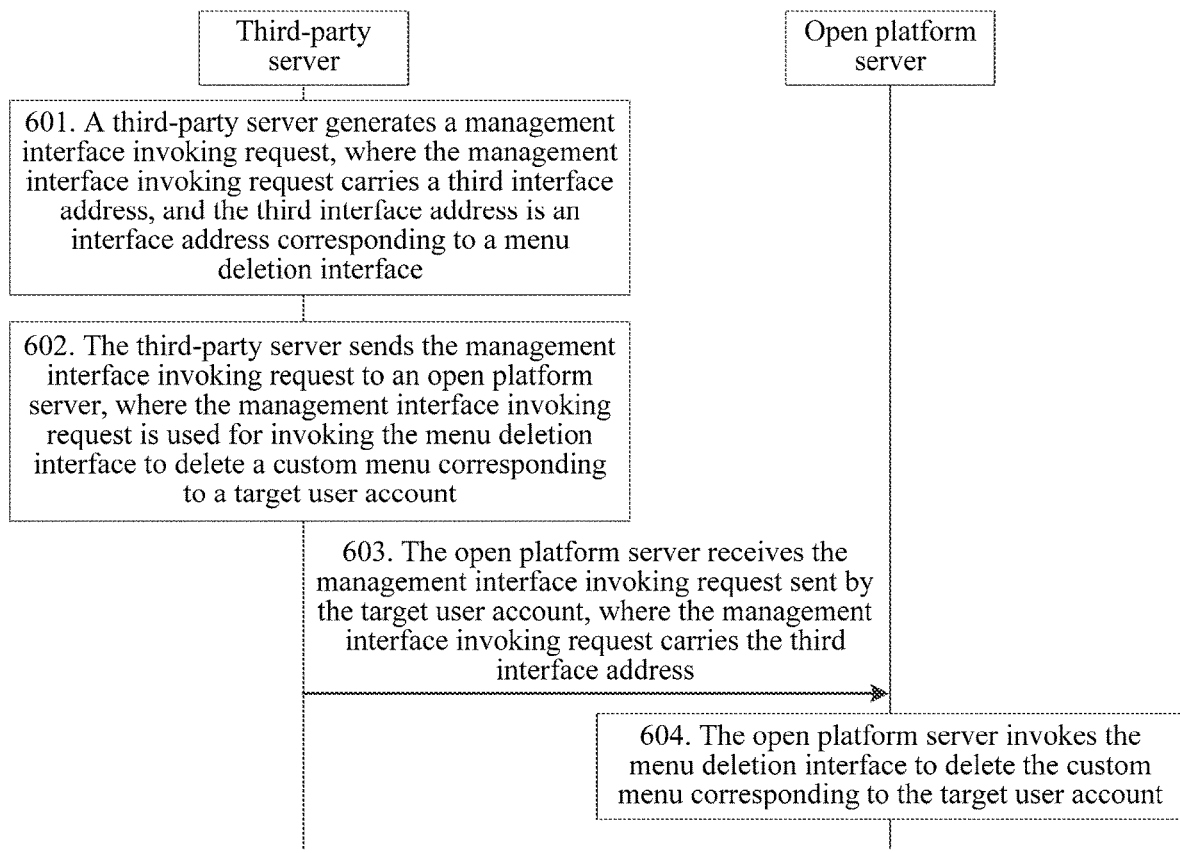
FIG. 6 is a method flowchart of a menu management method according to some embodiments of the present disclosure.

Referring to FIG. 6, FIG. 6 is a method flowchart of a menu management method according to an embodiment of the present disclosure. This embodiment is described by using an example in which the menu management method is applied to the implementation environment shown in FIG. 1. The menu management method includes:

Step 601: A third-party server generates a management interface invoking request, where the management interface invoking request carries a third interface address, and the third interface address is an interface address corresponding to a menu deletion interface.

After a customized menu is initially created, an operator may have a requirement of deleting the created customized menu. In this case, the operator may generate a management interface invoking request by using the third-party server, where the management interface invoking request carries a third interface address, and the third interface address is an interface address corresponding to the menu deletion interface.

This step may include the following sub-steps:

First, the third-party server obtains the third interface address corresponding to the menu deletion interface.

The menu deletion interface is an interface provided by a social networking platform server to the third-party server.

In an example, the third interface address corresponding to the menu deletion interface may be:
https://api.xxxxx.com/cgi-bin/menu/delete?

Second, the third-party server generates the management interface invoking request carrying the third interface address.

A request protocol used by the management interface invoking request may be the Hypertext Transfer Protocol (HTTP), or may be the Hyper Text Transfer Protocol over Secure Socket Layer (HTTPS), or another custom protocol. A request manner used by the management interface invoking request may be a POST request manner, or may be a GET request manner.

The third-party server generates the management interface invoking request carrying the third interface address. A request manner used by the management interface invoking request may be a GET request manner.

In an example, the management interface invoking request may use the GET request manner (the https Protocol is used):
https://api.xxxxx.com/cgi-bin/menu/delete?access_token=ACCESS_TOKEN
where access_token=ACCESS_TOKEN is an interface invoking authorization, and is obtained in advance by the third-party server from the social networking platform server, that is, the management interface invoking request may further carry the interface invoking authorization.

Step 602: The third-party server sends the management interface invoking request to a social networking platform server, where the management interface invoking request is used for invoking the menu deletion interface to delete a customized menu corresponding to an official account.

The third-party server sends the management interface invoking request to the social networking platform server by using the official account.

Step 603: The social networking platform server receives the management interface invoking request sent by the official account, where the management interface invoking request carries the third interface address.

Step 604: The social networking platform server invokes the menu deletion interface to delete the customized menu corresponding to the official account.

In conclusion, according to the menu management method provided in this embodiment, a social networking platform server provides a menu deletion interface, so that an operator may delete a created customized menu, thereby resolving a problem in a related technology that the social networking platform server only supports creation of a customized menu by the operator, and achieving an effect that the social networking platform server further supports a deletion operation performed by the operator on a customized menu.

Step 601 and step 602 may be independently implemented as a menu management method on the side of the third-party server. Step 603 and step 604 may be independently implemented as a menu management method on the side of the social networking platform server.

Figure 7:
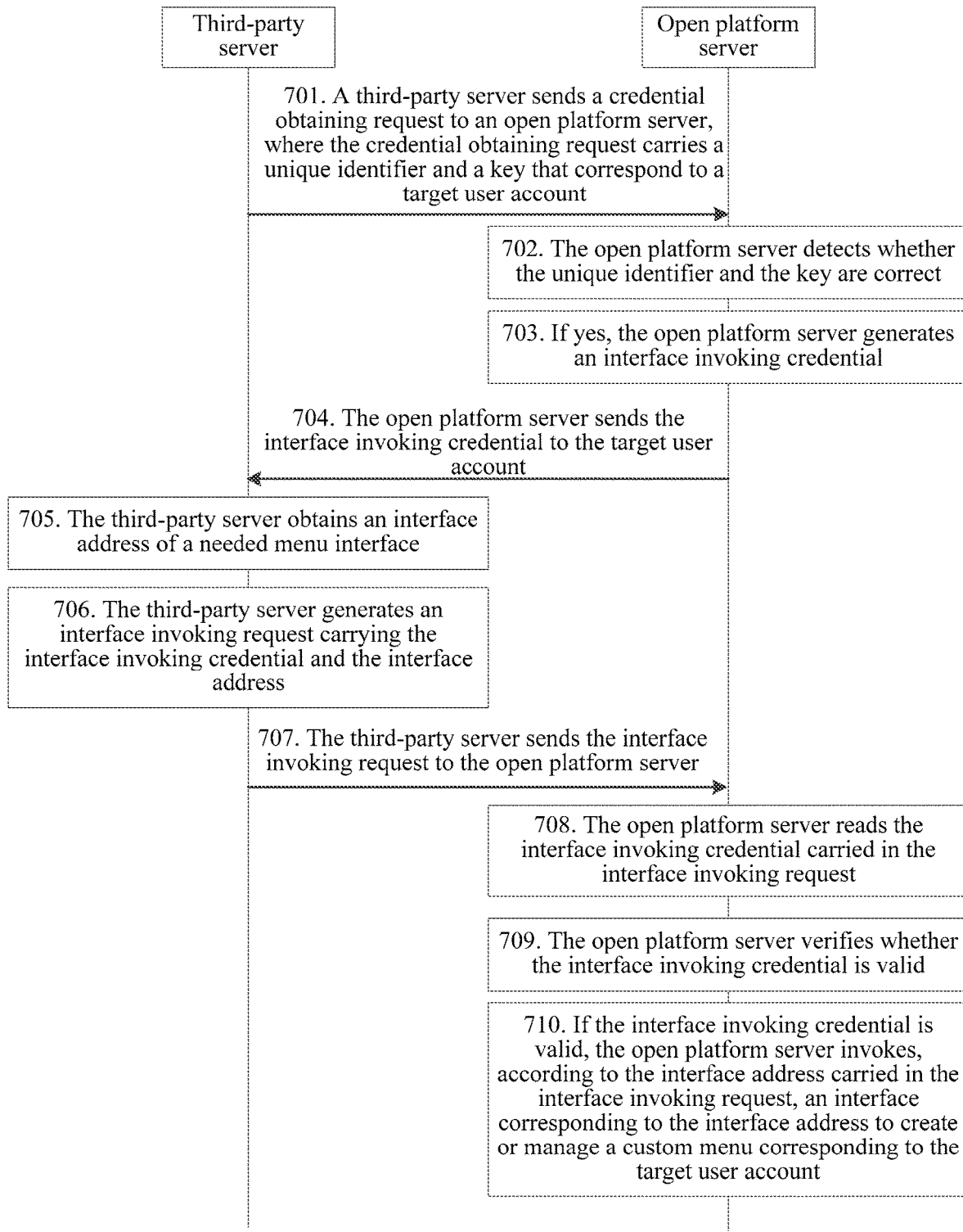
FIG. 7 is a method flowchart of a menu management method according to some embodiments of the present disclosure.

It should be additionally noted that to ensure the security of interface invoking, in the foregoing embodiments, the third-party server further needs to obtain an interface invoking authorization from the social networking platform server, and generate a creation interface invoking request or a management interface invoking request according to the obtained interface invoking authorization, as shown in FIG. 7:

Step 701: A third-party server sends an authorization obtaining request to a social networking platform server, where the authorization obtaining request carries a unique identifier and a key that correspond to an official account.

The unique identifier and the key are obtained by the third-party server in advance from the social networking platform server. For example, after finishing registration of the official account on the third-party server, the social networking platform server may send the corresponding unique identifier and the corresponding key to the third-party server.

Optionally, the third-party server may invoke a credential obtaining interface provided by the social networking platform server, where the credential obtaining interface is configured to provide the interface invoking authorization to the third-party server.

For example, a request protocol used by the authorization obtaining request is the HTTP, and a request manner is a GET request manner. An example of the authorization obtaining request is as follows: https://api xxxxx.com/cgi-bin/
token?grant_type=client_credential&appid=APPID&secret=APPSECRET Descriptions about the parameters in the authorization obtaining request are shown in Table 2:

TABLE 2

| Parameters | Descriptions |
| --- | --- |
| grant_type | An instruction for obtaining an interface invoking authorization access_token |
| appid | Unique identifier |
| secret | Key |

Correspondingly, the social networking platform server receives the authorization obtaining request sent by the official account.

Step 702: The social networking platform server detects whether the unique identifier and the key are correct.

Step 703: If yes, the social networking platform server generates an interface invoking authorization.

The interface invoking authorization is a credential used when the official account requests to invoke a menu creation interface or menu management interfaces. The social networking platform server may generate the interface invoking authorization according to the unique identifier and the key that correspond to the official account.

For example, the unique identifier and the key are calculated according to a predetermined algorithm, to obtain the interface invoking authorization. The interface invoking authorization may be a string. Alternatively, in another possible implementation manner, the interface invoking authorization may be a randomly generated string.

Optionally, the social networking platform server may further set a credential valid time corresponding to the interface invoking authorization. The interface invoking authorization is valid within the credential valid time. Otherwise, the interface invoking authorization expires and is invalid.

Step 704: The social networking platform server sends the interface invoking authorization to the official account.

For example, the social networking platform server sends returned data of a JavaScript Object Notation (JSON, a lightweight data interchange format) format to a third-party server corresponding to the official account, and the returned data is as follows: {"access_token": "ACCESS_TOKEN", "expires_in":7200}.

Descriptions about the parameters in the returned data are shown in Table 3:

TABLE 3

| Parameters | Descriptions |
| --- | --- |
| access_token | interface invoking authorization |
| expires_in | Credential valid time, unit: second |

Correspondingly, the third-party server receives the interface invoking authorization sent by the social networking platform server.

In addition, when the unique identifier and the key are incorrect, the social networking platform server may return error code and/or error information to the official account.

Step 705: The third-party server obtains an interface address of a needed menu interface.

When the third-party server needs to create a customized menu, the third-party server obtains a pre-configured interface address corresponding to a menu creation interface.

When the third-party server needs to recreate a customized menu, the third-party server obtains a first interface address corresponding to a menu recreation interface. When the menu creation interface and the menu recreation interface are a same interface, the pre-configured interface address and the first interface address may be the same.

When the third-party server needs to query a customized menu, the third-party server obtains a second interface address corresponding to a menu query interface.

When the third-party server needs to delete the customized menu, the third-party server obtains a third interface address corresponding to a menu deletion interface.

Step 706: The third-party server generates an interface invoking request carrying the interface invoking authorization and the interface address.

The interface invoking request may be a creation interface invoking request or a management interface invoking request.

Step 707: The third-party server sends the interface invoking request to the social networking platform server.

Step 708: The social networking platform server reads the interface invoking authorization carried in the interface invoking request.

Step 709: The social networking platform server verifies whether the interface invoking authorization is valid.

The social networking platform server may verify whether the interface invoking authorization is correct, and verify whether the interface invoking authorization expires. If the interface invoking authorization is correct and does not expire, it indicates that the interface invoking authorization is valid.

Step 710: If the interface invoking authorization is valid, the social networking platform server invokes, according to the interface address carried in the interface invoking request, an interface corresponding to the interface address to create or manage a customized menu corresponding to the official account.

Optionally, when the interface invoking authorization is invalid, for example, when the interface invoking authorization is incorrect or the interface invoking authorization expires, the social networking platform server may directly end the process, or may return the corresponding error code and/or the corresponding error information to the third-party server. Alternatively, when the interface invoking request does not carry any interface invoking authorization, the social networking platform server may directly end the process, or may return the corresponding error code and/or the corresponding error information to the third-party server.

In conclusion, according to the menu management method provided in this embodiment, a social networking platform server further provides an interface invoking authorization to an official account, so that a malicious user without the interface invoking authorization cannot abuse a menu creation interface and menu management interfaces that are provided by the social networking platform server, thereby ensuring the security of invoking, by the official account, an interface provided by the social networking platform server.

Figure 8:
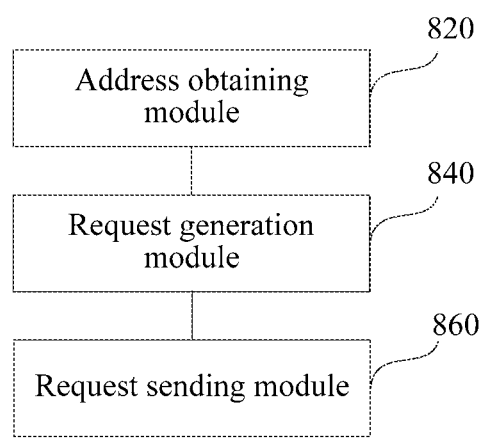
FIG. 8 is a structural block diagram of a menu management apparatus according to some embodiments of the present disclosure.

Referring to FIG. 8, FIG. 8 is a structural block diagram of a menu management apparatus according to an embodiment of the present disclosure. The menu management apparatus may be independently implemented as all or a part of a third-party server. The apparatus includes:

an address obtaining module 820, configured to obtain an interface address corresponding to a menu management interface, the menu management interface being an interface provided by a social networking platform server and configured to manage a customized menu corresponding to an official account, and the official account being a user account that an operator applies for on the social networking platform server;

a request generation module 840, configured to generate a management interface invoking request carrying the interface address, the management interface invoking request being used for invoking the menu management interface to perform a management operation on the customized menu; and a request sending module 860, configured to send the management interface invoking request to the social networking platform server.

In conclusion, according to the menu management apparatus provided in this embodiment, a social networking platform server provides a menu management interface, so that an operator may manage a created customized menu, thereby resolving a problem in a related technology that the social networking platform server only supports creation of a customized menu by the operator, and achieving an effect that the social networking platform server further supports a management operation, such as a recreation operation, a query operation, or a deletion operation, performed by the operator on a customized menu.

Figure 9:
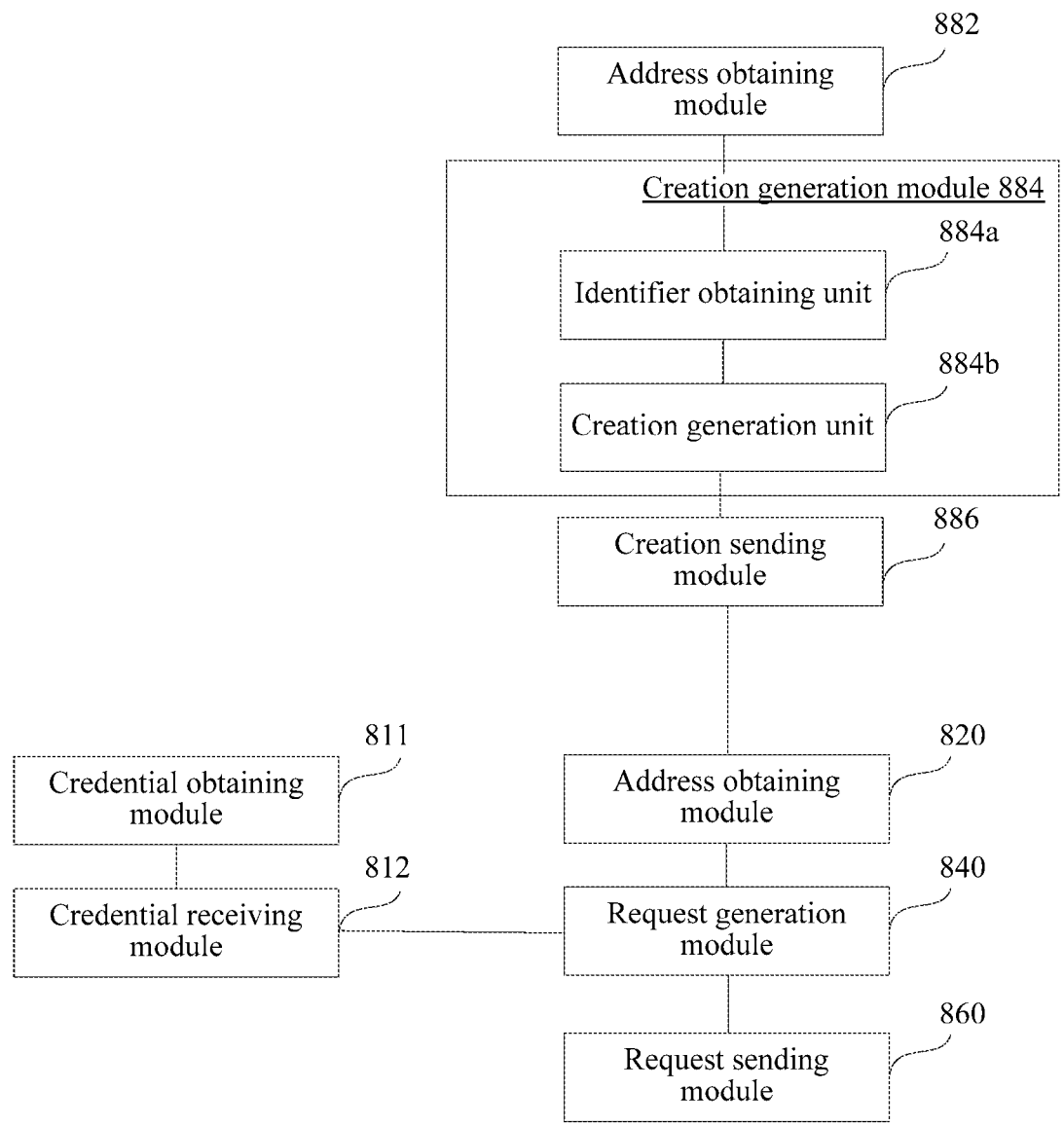
FIG. 9 is a structural block diagram of a menu management apparatus according to some embodiments of the present disclosure.

Referring to FIG. 9, FIG. 9 is a structural block diagram of a menu management apparatus according to an embodiment of the present disclosure. The menu management apparatus may be independently implemented as all or a part of a third-party server. The apparatus includes:

an address obtaining module 820, configured to obtain an interface address corresponding to a menu management interface, the menu management interface being an interface provided by a social networking platform server and configured to manage a customized menu corresponding to an official account, and the official account being a user account that an operator applies for on the social networking platform server;

a request generation module 840, configured to generate a management interface invoking request carrying the interface address, the management interface invoking request being used for invoking the menu management interface to perform a management operation on the customized menu; and a request sending module 860, configured to send the management interface invoking request to the social networking platform server.

Optionally, the menu management interface is a menu recreation interface, and the management interface invoking request carries a first interface address and menu item information of a recreated customized menu, where the first interface address is an interface address corresponding to the menu recreation interface; or the menu management interface is a menu query interface, and the management interface invoking request carries a second interface address, where the second interface address is an interface address corresponding to the menu query interface; or the menu management interface is a menu deletion interface, and the management interface invoking request carries a third interface address, where the third interface address is an interface address corresponding to the menu deletion interface.

Optionally, the apparatus further includes:

a credential obtaining module 811, configured to send an authorization obtaining request to the social networking platform server, where the authorization obtaining request carries a unique identifier and a key that correspond to the official account; and a credential receiving module 812, configured to receive an interface invoking authorization sent by the social networking platform server, where the request generation module 840 is configured to generate the management interface invoking request carrying the interface invoking authorization and the interface address.

Optionally, the apparatus further includes:

an address obtaining module 882, configured to obtain a pre-configured interface address corresponding to a menu creation interface;

a creation generation module 884, configured to generate a creation interface invoking request carrying the pre-configured interface address and menu item information of the customized menu, where the menu item information includes a click-event menu item and/or a link redirection menu item, the click-event menu item is a menu item that generates a click event after being triggered by a client, and the link redirection menu item is a menu item that redirects to a predetermined link after being triggered by a client; and a creation sending module 886, configured to send the creation interface invoking request to the social networking platform server, where the creation interface invoking request is used for invoking the menu creation interface to create the customized menu for the official account.

Optionally, the creation generation module 884 includes:

an identifier obtaining unit 884a, configured to obtain at least one group identifier, where the group identifier is an identifier of a group of followers that follow the official account; and a creation generation unit 884b, configured to generate a creation interface invoking request carrying the group identifier, the pre-configured interface address, and the menu item information of the customized menu, where the creation interface invoking request is used for invoking the menu creation interface to create, for the official account, the customized menu dedicated to the group of followers.

In conclusion, according to the menu management apparatus provided in this embodiment, a social networking platform server provides a menu management interface, so that an operator may manage a created customized menu, thereby resolving a problem in a related technology that the social networking platform server only supports that creation of a customized menu by an official account, and achieving an effect that the social networking platform server further supports a management operation, such as a recreation operation, a query operation, or a deletion operation, performed by the operator on a customized menu.

According to the menu management apparatus provided in this embodiment, a social networking platform server further provides an interface invoking authorization to an official account, so that a malicious user without the interface invoking authorization cannot abuse a menu creation interface and menu management interfaces that are provided by the social networking platform server, thereby ensuring the security of invoking, by the official account, an interface provided by the social networking platform server.

According to the menu management apparatus provided in this embodiment, for a same operator, different customized menus may be generated for different follower groups, so that the operator may provide different forms of customized menus for the different follower groups, so as to provide a more detailed and specific service.

Figure 10:
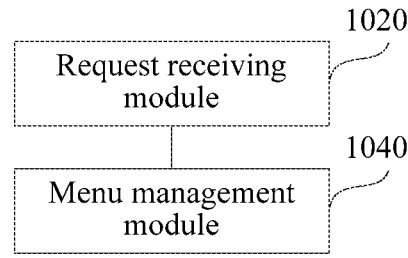
FIG. 10 is a structural block diagram of a menu management apparatus according to some embodiments of the present disclosure.

Referring to FIG. 10, FIG. 10 is a structural block diagram of a menu management apparatus according to an embodiment of the present disclosure. The menu management apparatus may be independently implemented as all or a part of a social networking platform server. The apparatus includes:

a request receiving module 1020, configured to receive a management interface invoking request sent by an official account, the official account being a user account that an operator applies for on a social networking platform server; and a menu management module 1040, configured to invoke, according to an interface address carried in the management interface invoking request, a menu management interface corresponding to the interface address, to perform a management operation on a customized menu of the official account, the menu management interface being an interface provided by the social networking platform server and configured to manage the customized menu corresponding to the official account.

In conclusion, according to the menu management apparatus provided in this embodiment, a social networking platform server provides a menu management interface, so that an operator may manage a created customized menu, thereby resolving a problem in a related technology that the social networking platform server only supports creation of a customized menu by an official account, and implementing an effect that the social networking platform server further supports that a management operation, such as a recreation operation, a query operation, or a deletion operation, performed by the operator on a customized menu.

Figure 11:
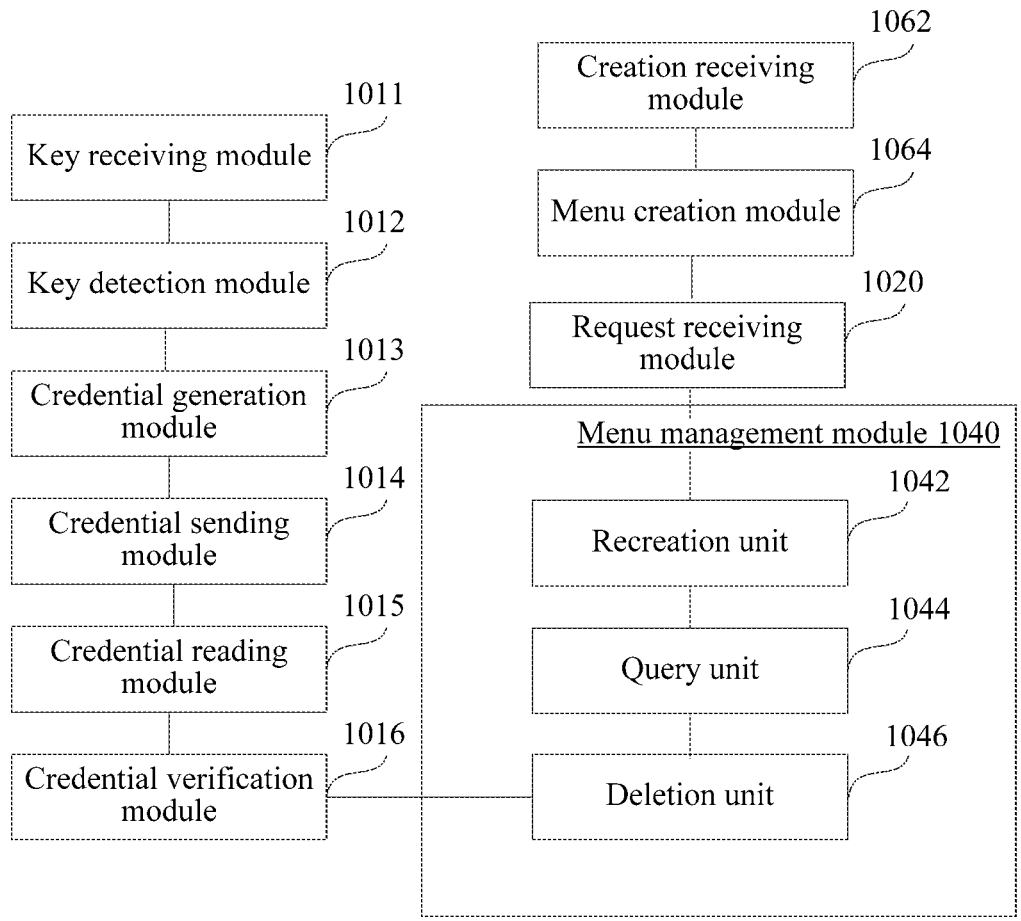
FIG. 11 is a structural block diagram of a menu management apparatus according to some embodiments of the present disclosure.

Referring to FIG. 11, FIG. 11 is a structural block diagram of a menu management apparatus according to another embodiment of the present disclosure. The menu management apparatus may be independently implemented as all or a part of a social networking platform server. The apparatus includes:

a request receiving module 1020, configured to receive a management interface invoking request sent by an official account, the official account being a user account that an operator applies for on a social networking platform server; and a menu management module 1040, configured to invoke, according to an interface address carried in the management interface invoking request, a menu management interface corresponding to the interface address, to perform a management operation on a customized menu of the official account, the menu management interface being an interface provided by the social networking platform server and configured to manage the customized menu corresponding to the official account.

Optionally, the menu management module 1040 includes:

a recreation unit 1042, configured to: when the management interface invoking request carries a first interface address and menu item information of a recreated customized menu, where the first interface address is an interface address corresponding to a menu recreation interface, invoke the menu recreation interface to recreate a customized menu corresponding to the official account;

a query unit 1044, configured to: when the management interface invoking request carries a second interface address, where the second interface address is an interface address corresponding to a menu query interface, invoke the menu query interface to query the customized menu generated for the official account and return the customized menu to the official account; and a deletion unit 1046, configured to: when the management interface invoking request carries a third interface address, where the third interface address is an interface address corresponding to a menu deletion interface, invoke the menu deletion interface to delete the customized menu corresponding to the official account.

Optionally, the apparatus further includes:

a key receiving module 1011, configured to receive an authorization obtaining request sent by the official account, where the authorization obtaining request carries a unique identifier and a key that correspond to the official account;

a key detection module 1012, configured to detect whether the unique identifier and the key are correct;

a credential generation module 1013, configured to: if a detection result of the key detection module 1012 is correct, generate an interface invoking authorization; and a credential sending module 1014, configured to send the interface invoking authorization to the official account.

Optionally, the management interface invoking request carries the interface invoking authorization. The apparatus further includes:

a credential reading module 1015, configured to read the interface invoking authorization carried in the management interface invoking request; and a credential verification module 1016, configured to verify whether the interface invoking authorization is valid, where the menu management module 1040 is configured to: if the credential verification module 1016 verifies that the interface invoking authorization is valid, perform the step of invoking, according to an interface address carried in the management interface invoking request, a menu management interface corresponding to the interface address, to perform a management operation on a customized menu of the official account.

Optionally, the apparatus further includes:

a creation receiving module 1062, configured to receive a creation interface invoking request sent by the official account, where the creation interface invoking request carries a pre-configured interface address and menu item information of the customized menu, the pre-configured interface address is an interface address corresponding to the creation interface invoking request, the menu item information includes a click-event menu item and/or a link redirection menu item, the click-event menu item is a menu item that generates a click event after being triggered by a client, and the link redirection menu item is a menu item that redirects to a predetermined link after being triggered by a client; and a menu creation module 1064, configured to invoke, according to the creation interface invoking request, a menu creation interface to create the customized menu for the official account.

Optionally, the menu creation module 1064 is configured to: when the creation interface invoking request further carries a group identifier, invoke, according to the creation interface invoking request, the menu creation interface to create, for the official account, the customized menu dedicated to the group of followers, where the group identifier is an identifier of a group of followers that follow the official account.

According to the menu management apparatus provided in this embodiment, a social networking platform server provides a menu management interface, so that an operator may manage a created customized menu, thereby resolving a problem in a related technology that the social networking platform server only supports creation of a customized menu by a third-party server, and implementing an effect that the social networking platform server further supports a management operation, such as a recreation operation, a query operation, or a deletion operation, performed by the operator on a customized menu.

According to the menu management apparatus provided in this embodiment, the social networking platform server further provides an interface invoking authorization to an official account, so that a malicious user without the interface invoking authorization cannot abuse a menu creation interface and menu management interfaces that are provided by the social networking platform server, thereby ensuring the security of invoking, by the official account, an interface provided by the social networking platform server.

According to the menu management apparatus provided in this embodiment, for a same operator, different customized menus may be generated for different follower groups, so that the operator may provide different forms of customized menus for the different follower groups, so as to provide a more detailed and specific service.

It should be noted that when the menu management apparatus provided in the foregoing embodiments manages a customized menu, the division of the foregoing function modules is merely used as an example for description. In an actual application, the foregoing functions may be allocated to and implemented by different functional modules according to needs, that is, an internal structure of a device is divided into different functional modules, so as to implement all or some of the functions described above. In addition, the menu management apparatus provided in the foregoing embodiments belongs to a same concept as the embodiments of the menu management method. For a specific implementation process, refer to the method embodiments. Details are not described herein again.

Figure 12:
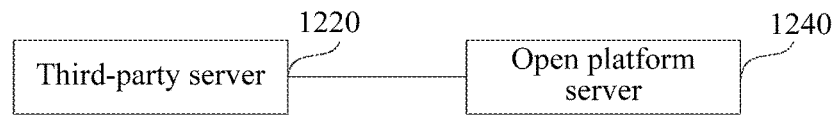
FIG. 12 is a structural block diagram of a menu management system according to some embodiments of the present disclosure.

Referring to FIG. 12, FIG. 12 is a structural block diagram of a menu management system according to an embodiment of the present disclosure. The system includes a third-party server 1220 and a social networking platform server 1240, the third-party server 1220 being connected to the social networking platform server 1240 by using a network.

The third-party server 1220 includes the menu management apparatus described in the embodiment of FIG. 8 or FIG. 9.

The social networking platform server 1240 includes the menu management apparatus described in FIG. 10 or FIG. 11.

Figure 13:
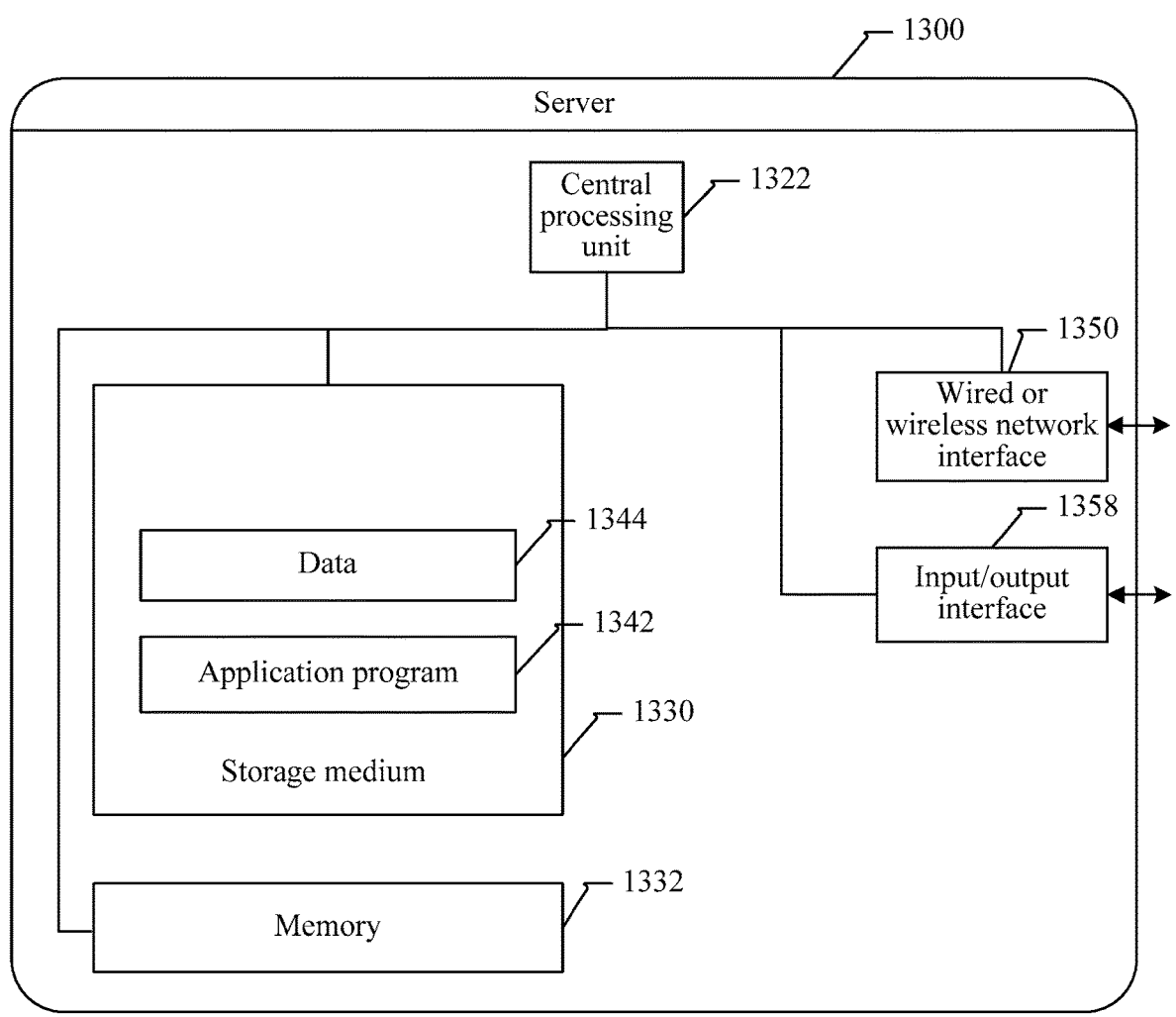
FIG. 13 is a structural block diagram of a third-party server according to some embodiments of the present disclosure.

Referring to FIG. 13, FIG. 13 is a structural block diagram of a third-party server according to an embodiment of the present disclosure. The server may be configured to execute the menu management method provided in the foregoing embodiments. Referring to FIG. 13, the server 1300 may differ a lot due to different configurations or performance, and may include one or more central processing units (CPUs) 1322 (for example, one or more processors), a memory 1332, and one or more storage media 1330 (for example, one or more mass storage devices) storing an application program 1342 or data 1344. The memory 1332 and the non-transitory computer-readable storage medium 1330 may be a transient storage or a persistent storage. The program stored in the storage medium 1330 may include one or more modules (not shown in the figure), and each module may include a series of instruction operations for the server. Furthermore, the central processing unit 1322 may be configured to communicate with the storage medium 1330, and perform, on the server 1300, a series of instruction operations in the storage medium 1330.

The server 1300 may further include one or more wired or wireless network interfaces 1350, one or more input/output interfaces 1358, and the like.

Specifically, in this embodiment, the one or more programs configured to be executed by one or more processors include instructions for performing the operations shown in the foregoing embodiments.

Figure 14:
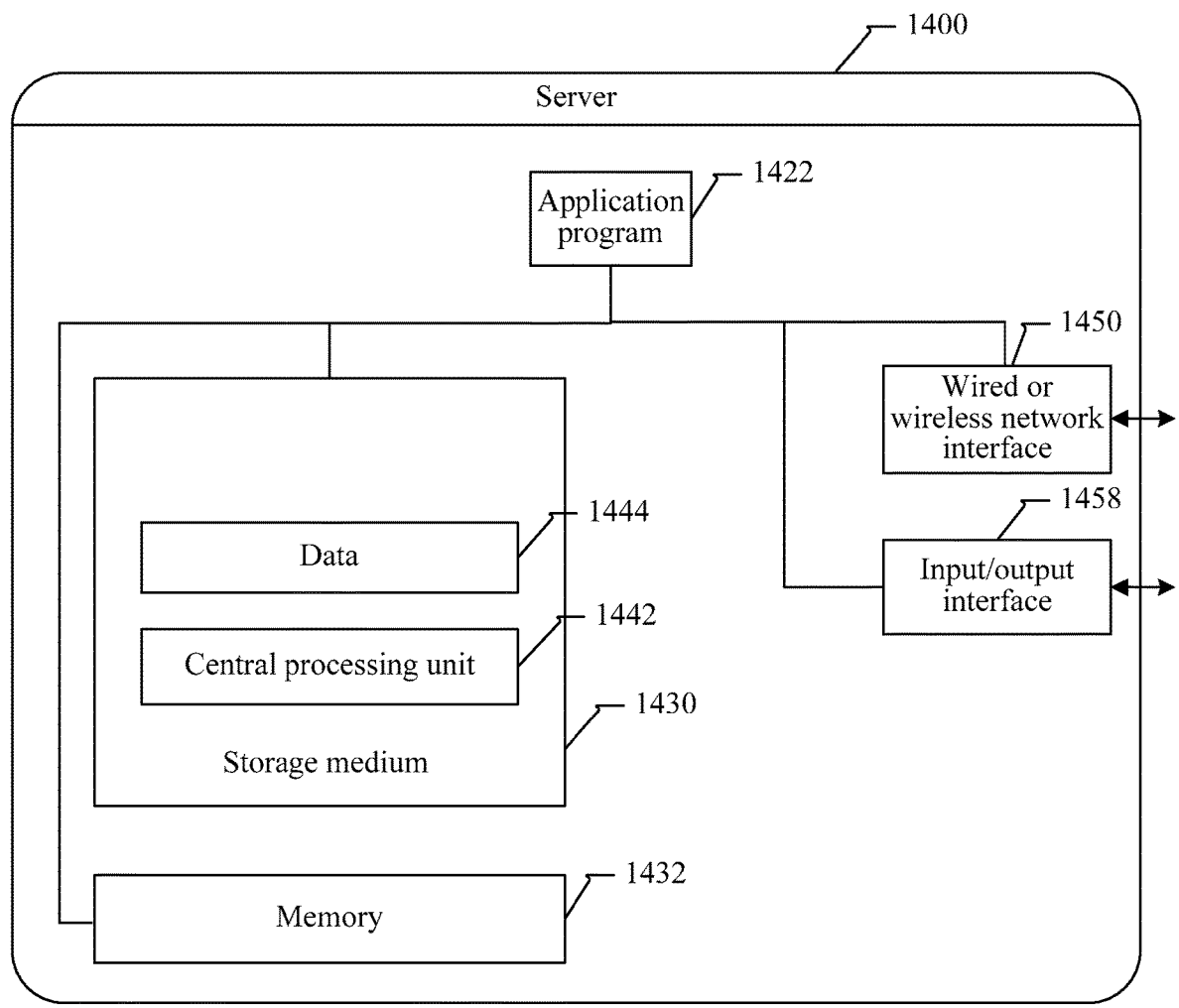
FIG. 14 is a structural block diagram of a social networking platform server according to some embodiments of the present disclosure.

Referring to FIG. 14, FIG. 14 is a structural block diagram of a social networking platform server according to an embodiment of the present disclosure. The server may be configured to execute the menu management method provided in the foregoing embodiments. Referring to FIG. 14, the server 1400 may differ a lot due to different configurations or performance, and may include one or more central processing units (CPUs) 1422 (for example, one or more processors), a memory 1432, and one or more storage media 1442 (for example, one or more mass storage devices) storing an application program 1442 or data 1444. The memory 1432 and the non-transitory computer-readable storage medium 1430 may be a transient storage or a persistent storage. The program stored in the storage medium 1430 may include one or more modules (not shown in the figure), and each module may include a series of instruction operations for the server. Furthermore, the central processing unit 1422 may be configured to communicate with the storage medium 1430, and perform, on the server 1400, a series of instruction operations in the storage medium 1430.

The server 1400 may further include one or more wired or wireless network interfaces 1450, one or more input/output interfaces 1458, and the like.

Specifically, in this embodiment, the one or more programs configured to be executed by one or more processors include instructions for performing the operations shown in the foregoing embodiments.

The sequence numbers of the foregoing embodiments of the present disclosure are merely for the convenience of description, and do not imply the preference among the embodiments.

In some embodiments, a menu management method is implemented at a computing device (e.g., the third-party server 1300 shown in FIG. 13) having one or more processors and memory storing programs to be executed by the one or more processors. The computing device sends a request for accessing a menu management interface at a social networking platform server (e.g., the social networking platform server 1400). The request includes an identifier of an official account at the social networking platform server. The official account is a special type of user account at the social networking platform that exchanges information with its follower user accounts that have registered with the social networking platform to subscribe to the information posted by the official account at the social networking platform. The computing device customizes, through the menu management interface, a user menu (e.g., as shown in FIGS. 3A and 3B) associated with the identifier of the official account. This customization process includes:

obtaining, from the social networking platform server, an interface address corresponding to the menu management interface;

generating a management interface invoking request carrying the interface address and sending the management interface invoking request to the social networking platform server;

receiving, from the social networking platform server, the management interface and changing at least one menu item of the user menu in accordance with the official account's definition; and returning the customized user menu to the social networking platform server.

Upon receipt of the customized user menu, the social networking platform server is configured to forward the customized user menu to a plurality of user accounts that have subscribed to follow the official account at the social networking platform server to enable the plurality of user accounts to exchange information with the official account through the customized user menu.

In some embodiments, the computing device changes at least one of a font size, a name, and a color of the menu item for one of the plurality of user accounts in accordance with an attribute of a mobile terminal associated with the one of the plurality of user accounts. Different attributes determine different customized user menus. In some embodiments, customizing the user menu according to the attribute of the mobile terminal includes customizing one or more of the menu items, or changing at least one menu items. In some embodiments, the attributes of the mobile terminal (e.g., mobile phone, or tablet) include at least one of its model number, screen size, physical location or language preferences, etc. For example, assuming that the mobile device has a default language preference as English. But when the mobile device changes its languages preference with different language such as Chinese. Due to the difference of language characteristics, the user menus vary at least in font size and characters. For example, when the mobile phone is moved back and forth between an outdoor brighter environment and an indoor dimmer environment, the user menu may be customized with different brightness settings and/or textual and/or image colors for ease of reading and operating. From the model number, it is possible to determine the screen size and performance (e.g., CPU/GPU processing speed) of the mobile device. Such information may be used for customizing the user menu items accordingly.

In some embodiments, the operation of changing the at least one menu item of the user menu includes deletion of the whole or part of the menu item. In some embodiments, the operation of changing the at least one menu item of the user menu includes changing the arrangement (e.g., locations) of the menu items. In some embodiments, the operation of changing the at least one menu item of the user menu includes configuring the menu item with a query function. In some embodiments, the operation of changing the at least one menu item of the user menu includes configuring the menu item with event-triggering function. In some embodiments, the operation of changing the at least one menu item of the user menu includes configuring the menu item with a redirection function in association with a preset redirected interface such that, in response to a user selection of the menu item of the customized menu, a corresponding user account is redirected to the preset redirected interface associated with the redirection function.

In some embodiments, the method incudes obtaining a pre-configured API; the operation of changing the at least one menu item of the user menu comprises configuring the menu item with the pre-configured API; in response to selecting the menu item, the pre-configured API is triggered.

In some embodiments, the method includes grouping the plurality of user accounts into multiple groups according to predefined criteria, each group having one or more group attributes shared by the user accounts in the group including, but not limited to, the corresponding users' location, gender, and age, etc.; and assigning, through the management interface, a set of respective user menu functions to each group of user accounts according to their respective group attributes.

In some embodiments, a computing device (e.g., the third-party server 1300 in FIG. 13) includes one or more processors; memory; and one or more programs stored in the memory and configured for execution by the one or more processors, the one or more programs further including instructions for:

sending a request for accessing a menu management interface at a social networking platform server, wherein the request includes an identifier of an official account at the social networking platform server; and customizing, through the menu management interface, a user menu associated with the identifier of the official account, further comprising:
    obtaining, from the social networking platform server, an interface address corresponding to the menu management interface;
    generating a management interface invoking request carrying the interface address and sending the management interface invoking request to the social networking platform server;
    receiving, from the social networking platform server, the management interface and changing at least one menu item of the user menu in accordance with the official account's definition; and
    returning the customized user menu to the social networking platform server, wherein the social networking platform server is configured to forward the customized user menu to a plurality of user accounts that have subscribed to follow the official account at the social networking platform server to enable the plurality of user accounts to exchange information with the official account through the customized user menu.

In some embodiments, a non-transitory computer-readable storage medium (e.g., storage media 1330 in FIG. 13), stores one or more programs for execution by one or more processors of a computing device, the one or more programs including instructions for:

sending a request for accessing a menu management interface at a social networking platform server, wherein the request includes an identifier of an official account at the social networking platform server; and customizing, through the menu management interface, a user menu associated with the identifier of the official account, further comprising:

obtaining, from the social networking platform server, an interface address corresponding to the menu management interface;

generating a management interface invoking request carrying the interface address and sending the management interface invoking request to the social networking platform server;

receiving, from the social networking platform server, the management interface and changing at least one menu item of the user menu in accordance with the official account's definition; and returning the customized user menu to the social networking platform server, wherein the social networking platform server is configured to forward the customized user menu to a plurality of user accounts that have subscribed to follow the official account at the social networking platform server to enable the plurality of user accounts to exchange information with the official account through the customized user menu.

A person of ordinary skill in the art may understand that all or some of the steps of the embodiments may be implemented by using hardware, or may be implemented by using a program by instructing related hardware. The program may be stored in a computer readable storage medium. The storage medium mentioned above may be a read-only memory, a magnetic disk, or an optical disc.

The foregoing descriptions are merely examples of the embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A menu management method performed at a computing device having one or more processors and memory storing one or more programs to be executed by the one or more processors, the method comprising:

sending a request for accessing a menu management interface at a social networking platform server, wherein the request includes an identifier of an official account at the social networking platform server, wherein a plurality of user accounts are subscribed to the official account, and the official account is a different type of user account from the plurality of user accounts; and customizing, through the menu management interface, a generic user menu associated with the identifier of the official account into a customized user menu, wherein the customized user menu has a display style defined by the generic user menu and is configured to be displayed on a portion of a plurality of content pages integrated into an official account interaction interface, further comprising:

obtaining, from the social networking platform server, an interface address corresponding to the menu management interface;

generating a management interface invoking request carrying the interface address and sending the management interface invoking request to the social networking platform server;

receiving, from the social networking platform server, the menu management interface and changing at least one menu item of the customized user menu in accordance with the official account's definition;

returning the customized user menu to the social networking platform server, wherein the social networking platform server is configured to forward the customized user menu to the plurality of user accounts that have subscribed to the official account at the social networking platform server and enable the plurality of user accounts to exchange information with the official account through the at least one changed menu item of the customized user menu;

grouping the plurality of user accounts into multiple groups according to predefined criteria, wherein the predefined criteria for grouping include a region or a subscription level, each group having one or more group attributes shared by the user accounts in the group, the user accounts in each group are all subscribed to the official account;

assigning, through the management interface, a set of respective customized user menu functions to each group of user accounts according to their respective group attributes, wherein different customized menus are generated for different groups; and displaying the different customized user menus to the users upon the users accessing the official account page.

2. The method according to claim 1, wherein the operation of changing the at least one menu item of the customized user menu in accordance with the official account's definition comprises changing at least one of a font size, a name, and a color of the menu item for one of the plurality of user accounts in accordance with an attribute of a mobile terminal associated with the one of the plurality of user accounts.

3. The method according to claim 1, wherein the operation of changing the at least one menu item of the customized user menu in accordance with the official account's definition comprises changing a location of the at least one menu item in the customized user menu.

4. The method according to claim 1, wherein the operation of changing the at least one menu item of the customized user menu in accordance with the official account's definition comprises configuring the menu item with a query function, an event-triggering function, or a redirection function.

5. The method according to claim 4, wherein the redirection function is in association with a preset redirected interface, and in response to a user selection of the menu item of the customized user menu, a corresponding user account is redirected to the preset redirected interface associated with the redirection function.

6. The method according to claim 1, wherein a menu item of the customized user menu comprises one or more of a click-event menu item, a link redirection menu item, a commenting menu item, a query menu item, a service menu item, a menu item for scanning a graphic code, and a menu item for opening a predetermined application.

7. The method of according to claim 6, wherein the service menu item is configured to provide services comprising query, notification, consultation, or customer service.

8. The method according to claim 1, further comprising receiving a credential comprising an interface invoking authorization when the official account requests to invoke the menu management interface or a menu creation interface, and wherein the social networking platform server generates the interface invoking authorization according to the identifier of the official account and a key that corresponds to the official account.

9. A computing device, comprising:
one or more processors;
memory; and
one or more programs stored in the memory and configured for execution by the one or more processors and cause the computing device to perform a plurality of operations including:
sending a request for accessing a menu management interface at a social networking platform server, wherein the request includes an identifier of an official account at the social networking platform server, and wherein a plurality of user accounts are subscribed to the official account, and the official account is a different type of user account from the plurality of user accounts; and
customizing, through the menu management interface, a generic user menu associated with the identifier of the official account into a customized user menu, wherein the customized user menu has a display style defined by the generic user menu and is configured to be displayed on a portion of a plurality of content pages integrated into an official account interaction interface, further comprising:
obtaining, from the social networking platform server, an interface address corresponding to the menu management interface;
generating a management interface invoking request carrying the interface address and sending the management interface invoking request to the social networking platform server;
receiving, from the social networking platform server, the menu management interface and changing at least one menu item of the customized user menu in accordance with the official account's definition;
returning the customized user menu to the social networking platform server, wherein the social networking platform server is configured to forward the customized user menu to the plurality of user accounts that have subscribed to the official account at the social networking platform server and enable the plurality of user accounts to exchange information with the official account through the at least one changed menu item of the customized user menu;
grouping the plurality of user accounts into multiple groups according to predefined criteria, wherein the predefined criteria for grouping include a region or a subscription level, each group having one or more group attributes shared by the user accounts in the group, the user accounts in each group are all subscribed to the official account;
assigning, through the management interface, a set of respective customized user menu functions to each group of user accounts according to their respective group attributes, wherein different customized menus are generated for different groups; and
displaying the different customized user menus to the users upon the users accessing the official account page.

10. The computing device according to claim 9, wherein the operation of changing the at least one menu item of the customized user menu in accordance with the official account's definition comprises changing at least one of a font size, a name, and a color of the menu item for one of the plurality of user accounts in accordance with an attribute of a mobile terminal associated with the one of the plurality of user accounts.

11. The computing device according to claim 9, wherein the operation of changing the at least one menu item of the customized user menu in accordance with the official account's definition comprises changing a location of the at least one menu item in the customized user menu.

12. The computing device according to claim 9, wherein the operation of changing the at least one menu item of the customized user menu in accordance with the official account's definition comprises configuring the menu item with a query function, an event-triggering function, or a redirection function.

13. The computing device according to claim 12, wherein the redirection function is in association with a preset redirected interface, and in response to a user selection of the menu item of the customized menu with the redirection function, a corresponding user account is redirected to the preset redirected interface associated with the redirection function.

14. The computing device according to claim 9, wherein the one or more programs cause the computing device to perform the plurality of operations including receiving a credential comprising an interface invoking authorization when the official account requests to invoke the menu management interface or a menu creation interface, and wherein the social networking platform server generates the interface invoking authorization according to the identifier of the official account and a key that corresponds to the official account.

15. A non-transitory computer-readable storage medium storing one or more programs for execution by one or more processors of a computing device and causing the computing device to perform a plurality of operations including:
sending a request for accessing a menu management interface at a social networking platform server, wherein the request includes an identifier of an official account at the social networking platform server, and wherein a plurality of user accounts are subscribed to the official account, and the official account is a different type of user account from the plurality of user accounts; and
customizing, through the menu management interface, a generic user menu associated with the identifier of the official account into a customized user menu, wherein the customized user menu has a display style defined by the generic user menu and is configured to be displayed on a portion of a plurality of content pages integrated into an official account interaction interface, further comprising:
obtaining, from the social networking platform server, an interface address corresponding to the menu management interface;
generating a management interface invoking request carrying the interface address and sending the management interface invoking request to the social networking platform server;
receiving, from the social networking platform server, the menu management interface and changing at least one menu item of the customized user menu in accordance with the official account's definition;
returning the customized user menu to the social networking platform server, wherein the social networking platform server is configured to forward the customized user menu to the plurality of user accounts that have subscribed to the official account at the social networking platform server and enable the plurality of user accounts to exchange information with the official account through the at least one changed menu item of the customized user menu;

grouping the plurality of user accounts into multiple groups according to predefined criteria, wherein the predefined criteria for grouping include a region or a subscription level, each group having one or more group attributes shared by the user accounts in the group, the user accounts in each group are all subscribed to the official account;

assigning, through the management interface, a set of respective customized user menu functions to each group of user accounts according to their respective group attributes, wherein different customized menus are generated for different groups; and displaying the different customized user menus to the users upon the users accessing the official account page.

16. The non-transitory computer-readable storage medium according to claim 15, wherein the operation of changing the at least one menu item of the customized user menu in accordance with the official account's definition comprises changing at least one of a font size, a name, and a color of the menu item for one of the plurality of user accounts in accordance with an attribute of a mobile terminal associated with the one of the plurality of user accounts.

17. The non-transitory computer-readable storage medium according to claim 15, wherein the operation of changing the at least one menu item of the customized user menu in accordance with the official account's definition comprises configuring the menu item with a redirection function in association with a preset redirected interface, and in response to a user selection of the menu item of the customized menu, a corresponding user account is redirected to the preset redirected interface associated with the redirection function.

* * * * *